US012754739B2

(12) United States Patent
Kim et al.

(10) Patent No.: US 12,754,739 B2
(45) Date of Patent: Oct. 6, 2026

(54) DATAFLOW-BASED GENERAL-PURPOSE PROCESSOR ARCHITECTURES WITH FEEDFORWARD REGISTER LANES

(71) Applicant: The Board of Trustees of the University of Illinois, Urbana, IL (US)

(72) Inventors: Nam Sung Kim, Champaign, IL (US); Dong Kai Wang, Urbana, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 272 days.

(21) Appl. No.: 18/301,776

(22) Filed: Apr. 17, 2023

(65) Prior Publication Data

US 2023/0333852 A1 Oct. 19, 2023

Related U.S. Application Data

(60) Provisional application No. 63/332,144, filed on Apr. 18, 2022.

(51) Int. Cl.

| | |
|---|---|
| ***G06F 9/38*** | (2018.01) |
| ***G06F 9/50*** | (2006.01) |
| ***G06F 15/82*** | (2006.01) |

(52) U.S. Cl.

CPC .......... *G06F 9/3826* (2013.01); *G06F 9/3885* (2013.01); *G06F 9/5038* (2013.01); *G06F 15/825* (2013.01)

(58) Field of Classification Search

CPC .... G06F 9/3826; G06F 9/3885; G06F 9/5027; G06F 9/5038; G06F 15/7867; G06F 15/80; G06F 15/825

See application file for complete search history.

(56) References Cited

U.S. PATENT DOCUMENTS

| | | | | |
|---|---|---|---|---|
| 9,672,188 | B2 | 6/2017 | Vorbach | |
| 11,003,458 | B2 | 5/2021 | Etsion et al. | |
| 11,354,157 | B2 * | 6/2022 | Voitsechov | G06F 15/7867 |
| 2007/0113046 | A1 * | 5/2007 | Vorbach | G06F 15/803 712/15 |
| 2012/0216012 | A1 * | 8/2012 | Vorbach | G06F 9/3001 712/E9.003 |
| 2019/0004994 | A1 | 1/2019 | Fleming et al. | |

(Continued)

OTHER PUBLICATIONS

Sarkar et al., “Compile-time Partitioning and Scheduling of Parallel Programs”, ACM, 1986, pp. 17-26.*

(Continued)

*Primary Examiner* — David J. Huisman
(74) *Attorney, Agent, or Firm* — Quarles & Brady LLP

(57) ABSTRACT

A dataflow-based general-purpose processor architecture and its method are disclosed. A circuit for the dataflow-based general-purpose processor architecture includes multiple processing elements (PEs) corresponding to multiple assigned central processing unit (CPU) instructions in program order, a register file, and multiple feedforward register lanes configured to map each of the multiple assigned CPU instructions on the multiple PEs to the register file or another PE of the multiple PEs to construct a hardware datapath corresponding to a dataflow graph of the multiple assigned CPU instructions. Other aspects, embodiments, and features are also claimed and described.

21 Claims, 13 Drawing Sheets

(56) References Cited

U.S. PATENT DOCUMENTS

2019/0079761 A1* 3/2019 Deame .................... G06F 15/80

OTHER PUBLICATIONS

Papadopolous, "Implementation of a General Purpose Dataflow Multiprocessor", MIT, Aug. 1988, 155 pages.*
Waingold et al., "Baring It All to Software: Raw Machines", IEEE, 1997, pp. 86-93.*
Capalija et al., "A High-Performance Overlay Architecture for Pipelined Execution of Data Flow Graphs", IEEE, 2013, 8 pages.*
Sodani, Avinash, and Gurindar S. Sohi. "Dynamic instruction reuse." ACM SIGARCH Computer Architecture News 25.2 (1997): 194-205.
Venkatesh, Ganesh, et al. "Conservation cores: reducing the energy of mature computations." ACM Sigplan Notices 45.3 (2010): 205-218.
Papadopoulos, Gregory M., and David E. Culler. "Monsoon: an explicit token-store architecture." ACM SIGARCH Computer Architecture News 18.2SI (1990): 82-91.
Kim, Ho-Seop, and James E. Smith. "An instruction set and microarchitecture for instruction level distributed processing." ACM SIGARCH Computer Architecture News 30.2 (2002): 71-81.
Kavi, Krishna M., Roberto Giorgi, and Joseph Arul. "Scheduled dataflow: Execution paradigm, architecture, and performance evaluation." IEEE Transactions on Computers 50.8 (2001): 834-846.
Mishra, Mahim, et al. "Tartan: evaluating spatial computation for whole program execution." ACM SIGARCH Computer Architecture News 34.5 (2006): 163-174.
Binkert, N., et al. "The gem5 Simulator. SIGARCH Computer Architecture News (CAN)." (2011): 1-7.
Vedder, Rex, and Dennis Finn. "The Hughes data flow multiprocessor: Architecture for efficient signal and data processing." ACM SIGARCH Computer Architecture News 13.3 (1985): 324-332.
Karp, Richard M., and Rayamond E. Miller. "Properties of a model for parallel computations: Determinacy, termination, queueing." SIAM Journal on Applied Mathematics 14.6 (1966): 1390-1411.
Tomasulo, Robert M. "An efficient algorithm for exploiting multiple arithmetic units." IBM Journal of research and Development 11.1 (1967): 25-33.
Goldstein, Seth Copen, et al. "PipeRench: A reconfigurable architecture and compiler." Computer 33.4 (2000): 70-77.
Keckler, Stephen W., et al. "GPUs and the future of parallel computing." IEEE micro 31.5 (2011): 7-17.
Swanson, Steven, et al. "The wavescalar architecture." ACM Transactions on Computer Systems (TOCS) 25.2 (2007): 1-54.
Chen, Tianshi, et al. "Diannao: A small-footprint high-throughput accelerator for ubiquitous machine-learning." ACM SIGARCH Computer Architecture News 42.1 (2014): 269-284.
Govindaraju, Venkatraman, et al. "Dyser: Unifying functionality and parallelism specialization for energy-efficient computing." IEEE Micro 32.5 (2012): 38-51.
Lee, Walter, et al. "Space-time scheduling of instruction-level parallelism on a raw machine." ACM SIGOPS Operating Systems Review 32.5 (1998): 46-57.
Hwu, Wen-mei, and Yale N. Patt. "HPSm, a high performance restricted data flow architecture having minimal functionality." ACM SIGARCH Computer Architecture News 14.2 (1986): 297-306.
V. G. Grafe, G. S. Davidson, J. E. Hoch, and V. P. Holmes. 1989. The Epsilon dataflow processor. SIGARCH Comput. Archit. News 17, 3 (Jun. 1989), 36-45. https://doi.org/10.1145/74926.74930.
Smith, Aaron, Jim Burrill, Jon Gibson, Bertrand Maher, Nick Nethercote, Bill Yoder, Doug Burger, and Kathryn S. McKinley. "Compiling for Edge architectures." In International Symposium on Code Generation and Optimization (CGO'06), pp. 1-11. IEEE, 2006.
Fuchs, Adi, and David Wentzlaff. "The accelerator wall: Limits of chip specialization." In 2019 IEEE International Symposium on High Performance Computer Architecture (HPCA), pp. 1-14. IEEE, 2019.
Davis, Alan L. "The architecture and system method of DDM1: A recursively structured data driven machine." In Proceedings of the 5th annual symposium on Computer architecture, pp. 210-215. 1978.
Lottarini, Andrea, João p. Cerqueira, Thomas J. Repetti, Stephen A. Edwards, Kenneth A. Ross, Mingoo Seok, and Martha A. Kim. "Master of none acceleration: A comparison of accelerator architectures for analytical query processing." In Proceedings of the 46th International Symposium on Computer Architecture, pp. 762-773. 2019.
Kuck, David, Edward Davidson, D. Lawrie, Ahmed Sameh, Chuan-Qi Zhu, A. Veidenbaum, Jeff Konicek et al. "The Cedar system and an initial performance study." In Proceedings of the 20th Annual International Symposium on Computer Architecture, pp. 213-223. 1993.
Wang, Dong Kai, and Nam Sung Kim. "DiAG: A dataflow-inspired architecture for general-purpose processors." In Proceedings of the 26th ACM International Conference on Architectural Support for Programming Languages and Operating Systems, pp. 93-106. 2021.
Ipek, Engin, Meyrem Kirman, Nevin Kirman, and Jose F. Martinez. "Core fusion: accommodating software diversity in chip multiprocessors." In Proceedings of the 34th annual international symposium on Computer architecture, pp. 186-197. 2007.
Gunadi, Erika, and Mikko H. Lipasti. "CRIB: Consolidated rename, issue, and bypass." In Proceedings of the 38th annual international symposium on Computer architecture, pp. 23-32. 2011.
Esmaeilzadeh, Hadi, Emily Blem, Renee St. Amant, Karthikeyan Sankaralingam, and Doug Burger. "Dark silicon and the end of multicore scaling." In Proceedings of the 38th annual international symposium on Computer architecture, pp. 365-376. 2011.
Dennis, Jack B., and David P. Misunas. "A preliminary architecture for a basic data-flow processor." In Proceedings of the 2nd annual symposium on Computer architecture, pp. 126-132. 1974.
Sankaralingam, Karthikeyan, Ramadass Nagarajan, Haiming Liu, Changkyu Kim, Jaehyuk Huh, Doug Burger, Stephen W. Keckler, and Charles R. Moore. "Exploiting ILP, TLP, and DLP with the polymorphous TRIPS architecture." In Proceedings of the 30th annual international symposium on Computer architecture, pp. 422-433. 2003.
Hayenga, Mitchell, Vignyan Reddy Kothinti Naresh, and Mikko H. Lipasti. "Revolver: Processor architecture for power efficient loop execution." In 2014 IEEE 20th International Symposium on High Performance Computer Architecture (HPCA), pp. 591-602. IEEE, 2014.
Jouppi, Norman P., Cliff Young, Nishant Patil, David Patterson, Gaurav Agrawal, Raminder Bajwa, Sarah Bates et al. "In-datacenter performance analysis of a tensor processing unit." In Proceedings of the 44th annual international symposium on computer architecture, pp. 1-12. 2017.
Marcuello, Pedro, and Antonio Gonzalez. "Clustered speculative multithreaded processors." In Proceedings of the 13th International Conference on Supercomputing, pp. 365-372. 1999.
Li, Sheng, Ke Chen, Jung Ho Ahn, Jay B. Brockman, and Norman P. Jouppi. "CACTI-P: Architecture-level modeling for SRAM-based structures with advanced leakage reduction techniques." In 2011 IEEE/ACM International Conference on Computer-Aided Design (ICCAD), pp. 694-701. IEEE, 2011.
Palacharla, Subbarao, Norman P. Jouppi, and James E. Smith. "Complexity-effective superscalar processors." In Proceedings of the 24th annual international symposium on Computer architecture, pp. 206-218. 1997.
Nowatzki, Tony, Vinay Gangadhar, Newsha Ardalani, and Karthikeyan Sankaralingam. "Stream-dataflow acceleration." In Proceedings of the 44th Annual International Symposium on Computer Architecture, pp. 416-429. 2017.
Yuba, Toshitsugu, Kei Hiraki, Toshio Shimada, Satoshi Sekiguchi, and Kenji Nishida. "The SIGMA-1 dataflow computer." In Proceedings of the 1987 Fall Joint Computer Conference on Exploring technology: today and tomorrow, pp. 578-585. 1987.

(56) References Cited

OTHER PUBLICATIONS

Etsion, Yoav, Felipe Cabarcas, Alejandro Rico, Alex Ramirez, Rosa M. Badia, Eduard Ayguade, Jesus Labarta, and Mateo Valero. “Task superscalar: An out-of-order task pipeline.” In 2010 43rd Annual IEEE/ACM International Symposium on Microarchitecture, pp. 89-100. IEEE, 2010.
Chen, Yu-Hsin, et al. “Eyeriss: An energy-efficient reconfigurable accelerator for deep convolutional neural networks.” MIT Open Access Articles (2016): 1-4.
Swanson, Steven, et al. “The WaveScalar Architecture.” ACM Transactions on Computer Systems (TOCS) 25.2 (2007): 1-144.
Kim, Changkyu, Simha Sethumadhavan, Madhu S. Govindan, Nitya Ranganathan, Divya Gulati, Doug Burger, and Stephen W. Keckler. “Composable lightweight processors.” In 40th Annual IEEE/ACM International Symposium on Microarchitecture (MICRO 2007), pp. 1-13. IEEE, 2007.
Gunadi, Erika, and Mikko H. Lipasti. “CRIB: Consolidated rename, issue, and bypass.” In Proceedings of the 38th annual international symposium on Computer architecture, pp. 1-154. 2011.
Li, Sheng, An integrated power, area, and timing modeling framework for the design of multithreaded and multi/ manycore architectures. University of Notre Dame, 2010. (pp. 1-183).
Li, Sheng, Ke Chen, Jung Ho Ahn, Jay B. Brockman, and Norman P. Jouppi. “CACTI-P: Architecture-level modeling for SRAM-based structures with advanced leakage reduction techniques.” In 2011 IEEE/ACM International Conference on Computer-Aided Design (ICCAD), pp. 1-8. IEEE, 2011.
Li, S., Ahn, J. H., Strong, R. D., Brockman, J. B., Tullsen, D. M., & Jouppi, N. P. (Dec. 2009). McPAT: An integrated power, area, and timing modeling framework for multicore and manycore architectures. In Proceedings of the 42nd annual ieee/acm international symposium on microarchitecture (pp. 1-12).

* cited by examiner

DATAFLOW-BASED GENERAL-PURPOSE PROCESSOR ARCHITECTURES WITH FEEDFORWARD REGISTER LANES

CROSS-REFERENCE TO RELATED APPLICATION

The present application is based on and claims priority from U.S. Provisional Patent Application No. 63/332,144, filed on Apr. 18, 2022, the entire disclosure of which incorporated by reference.

STATEMENT OF GOVERNMENT SUPPORT

N/A

INTRODUCTION

As transistor technology continues development, new transistors may be provided with reduced physical dimensions; but, the supply voltage for these new transistors may not be scaled downward at a similar pace. This disparity can lead to a circuit utilization wall, or "dark silicon," resulting in only a fraction of the circuit that can be powered-on under the same power budget or requiring an increase in the power budget. This result can be exacerbated when the circuit is or includes a general-purpose processor. As the demand for efficient computer processing continues to increase, research and development continue to advance general-purpose processor technologies to meet the growing demand for improved performance and energy efficiency.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one example, a circuit for a dataflow-based general-purpose processor architecture is disclosed. The circuit includes multiple processing elements (PEs) corresponding to multiple assigned central processing unit (CPU) instructions in program order, a register file, and multiple feedforward register lanes configured to map each of the multiple assigned CPU instructions on the multiple PEs to the register file or another PE of the multiple PEs to construct a hardware datapath corresponding to a dataflow graph of the multiple assigned CPU instructions.

In another example, a method for a dataflow-based general-purpose processor architecture is disclosed. The method includes: assigning a plurality of central processing unit (CPU) instructions to a plurality of processing elements (PEs) in program order, mapping a plurality of feedforward register lanes to the plurality of PEs corresponding to the plurality of CPU instructions to erect a hardware datapath corresponding to a dataflow graph of the plurality of assigned CPU instructions, concurrently executing at least two assigned CPU instructions of the plurality of assigned CPU instructions, and committing the plurality of CPU instructions in program order.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
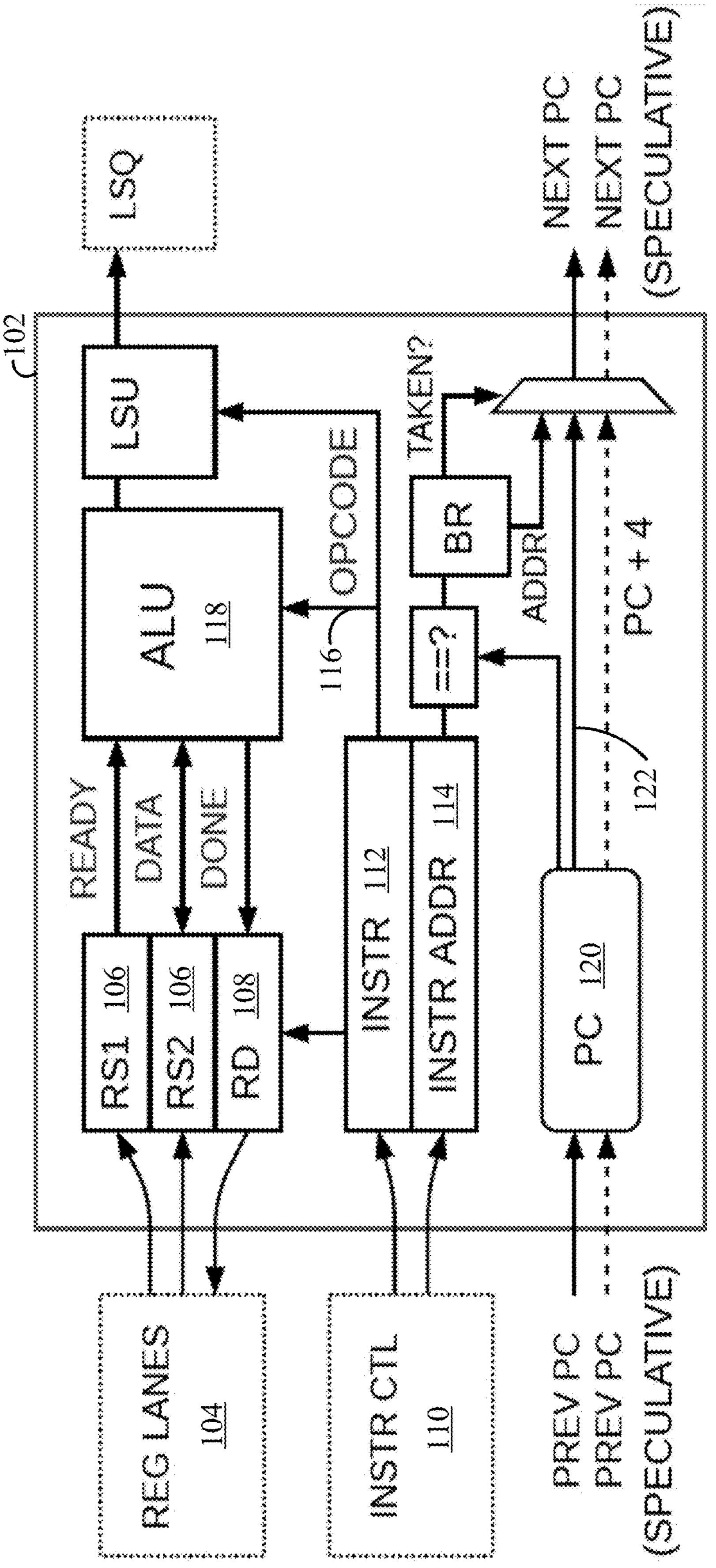
FIG. 1 is an illustration of an example control structure of a processing element (PE) according to some embodiments.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, those skilled in the art will readily recognize that these concepts may be practiced without these specific details. In some instances, this description provides well known structures and components in block diagram form in order to avoid obscuring such concepts.

As described above, as transistor technology continues to progress and scale downward in size, the disparity between the shrinking dimensions of a transistor and its (non-shrinking) supply voltage can cause only a fraction of the general-purpose processor to be powered-on under the same power budget. Dataflow processors have shown promising results in improving efficiency by eliminating control overheads of out-of-order CPUs, but dataflow processors tend to require dedicated compilers and instruction sets to operate and are typically used today as domain-specific accelerators. Some embodiments described herein provide solutions to these and other problems by providing dataflow-based general-purpose processor architectures or dynamic dataflow architectures for general purpose processors. For example, the dataflow-based general-purpose processor architecture described herein significantly improves energy efficiency by exploiting a dataflow graph (DFG) in hardware, instruction reuse, and parallelism. The dataflow-based general-purpose processor architecture at the same time retains the generality of traditional central processor units (CPUs) and retains support for existing instruction sets and program binaries.

In some examples, a dataflow-based general-purpose processor architecture dynamically maps a dataflow graph (DFG) of a program in hardware as it executes. For example, the dataflow-based general-purpose processor architecture can map the program's DFG dynamically in hardware by extending the register file into lanes, which are feedforward data wires along with or without a valid bit. Rather than constructing the DFG explicitly, the dataflow-based general-purpose processor architecture assigns program instructions in-order to a row of processing elements (PEs). Each PE reads its assigned instruction's source operands from register lanes based on the instruction's source register address(es) and writes its output to the destination lane based on the instruction's destination register address. This constructs a flattened DFG since register lanes forward all values from producer to consumer instructions. Each PE can begin executing as soon as their operands are valid. Thus, the architecture can fetch, decode, and execute instructions normally but as it executes, also construct a hardware datapath that replicate the program's dataflow graph.

In further examples, the dynamically constructed hardware datapath can be reused when a loop is encountered and bypasses the costly front-end that would otherwise have to re-fetch and decode the same instructions again. In some examples, the instruction reuse can be automatically done by backward branches in the program and further boosts energy efficiency.

In further examples, the hardware datapath can be pipelined to exploit data-level parallelism and eliminate front-end control overheads of traditional microprocessors. In addition, the architecture achieves the instruction-level parallelism by assigning instructions to PEs in program order but allowing multiple instructions to execute concurrently. Further, the architecture can exploit the thread-level parallelism by pipelining the dynamic datapaths such that fixed sets of instruction operations are grouped to form pipeline stages to scale compute throughput with the number of PEs.

In even further examples, the dataflow-based general-purpose processor architecture is plug-and-play and uses a standard reduced instruction set computer (RISC) instruction set without requiring new extensions, libraries, or compilers. Thus, the dataflow-based general-purpose processor architecture supports existing software and maintains transparency to programmers.

In testing, the dataflow-based general-purpose processor architecture prototype that supports the RISC-V instruction set architecture (ISA) was implemented in SystemVerilog, and its performance, power consumption, and area were evaluated with electronic design automation (EDA) tools. In the testing, the architecture configured with 512 PEs achieves a 1.18× speedup and 1.63× improvement in energy efficiency against an aggressive out-of-order CPU baseline.

The dataflow-based general-purpose processor architecture can be commercially sold as standalone processors (CPUs) or coprocessors. The architecture and hardware are highly parametrizable and can be configured into different models for different use cases. The architecture can be used to execute and accelerate workloads in data centers or be tuned for energy efficiently in edge environments.

In some embodiments, a circuit for a dataflow-based general-purpose processor architecture includes multiple processing elements (PEs) corresponding to multiple assigned central processing unit (CPU) instructions in program order, a register file, and multiple feedforward register lanes configured to map each of the plurality of assigned CPU instructions on the multiple PEs to the register file or another PE of the plurality of PEs to construct a hardware datapath corresponding to a dataflow graph of the multiple assigned CPU instructions.

In some examples, the circuit for a dataflow-based general-purpose processor architecture can include a general-purpose processor, a processing cluster with a register file, one or more integrated circuits on a die, communicatively coupled multiple circuits or any other suitable device including electrical component(s).

In some examples, multiple PEs are physically arranged in a line on the circuit. A PE is a basic unit to compute a CPU instruction based on two source operands to produce an output.

Referring to FIG. 1, an example control structure of a PE 102 is shown. A PE 102 receives or accesses one or more source operands from one or more register lanes 104 and a CPU instruction 112 from an instruction controller 110. In some examples, a CPU instruction 112 is assigned to a PE 102. In further examples, each PE 102 can have an instruction address register 114 that holds an address of the instruction 112 assigned to the PE 102. In some examples, a source operand can include data or a data stored memory location. In further examples, the source operands can be received or accessed when the source operands are available and stored in corresponding source registers 106 in the PE 102.

In some examples, a CPU instruction 112 can include an operation code 116 to specify an operation to be performed.

The operation to be performed can include an addition operation, a subtraction operation, a logical AND operation, a logical OR operation, a logical XOR operation, an increment operation, a decrement operation, or a logical NOT operation, or any other suitable computing operation. An arithmetic logic unit (ALU) 118 in the PE 102 performs the operation indicated by the operation code 116 of the instruction 112 along with the one or more source operands from the source registers 106. The result of the ALU 118 of the operation for the one or more source operands can be written on a destination register lane of the register lanes 104. In some examples, the result can be stored in a destination register 108 in the PE 102 and provided to the register lane 104. In some instruction set architectures (ISAs), regular instructions use up to two source registers 106 (RS1, RS2) and write to one destination register 108 (RD). However, register values are transient by design, and source registers of one instruction may be destination registers written by some preceding instruction. Rather than implementing a fixed register file, the example data-flow general-purpose processor architecture uses an interconnect of wires (e.g., feedforward register lanes 104) linking outputs of one PE to inputs of subsequent PEs.

In further examples, the PE 102 can include a program counter 120 (PC), which may be a value that is incremented (e.g., by 4 in each PE it passes through). For example, the PE 102 can receive the PC 120 from another PE, increment the PC 120 by an instruction length (e.g., 4), and output the (incremented) PC 120 to a further PE. For example, the PC 120 can be incremented by 4 in each PE it passes through (without actual addition), unless it encounters a branch or jump instruction. In further examples, the circuit of the example architecture can further include a program counter lane crossing the multiple PEs for committing the plurality of assigned CPU instructions in program order.

In some examples, the instruction controller 110 can assign multiple CPU instructions to multiple PEs in program order. In some examples, multiple PEs are physically arranged in a line (e.g., a row, a column, a diagonal line) on the circuit rather than arranged in a two-dimensional tile. In further examples, multiple PEs can be aligned in a line. In other examples, multiple PEs can be arranged in multiple lines. In some examples, a computer program can include multiple CPU instructions in sequence. In further examples, the computer program can include multiple control-free sequence of code blocks. Each code block can include multiple CPU instructions in sequence. In some examples, the instruction controller 110 can read multiple CPU instructions in sequence (e.g., a CPU instruction in the first line of code block and another CPU instruction in the next line of code block) and assign the multiple CPU instructions to multiple PEs, which are arranged in a line, in program order. For example, the instruction controller 110 assigns a first CPU instruction in the first line of code block to a first PE, which is located next to a register file, and a second CPU instruction in the second line of code block to a second PE arranged next to the first PE in a line (e.g., from left to right, from right to left, from top to down, from down to top, diagonally from the register file, etc.).

Figure 2:
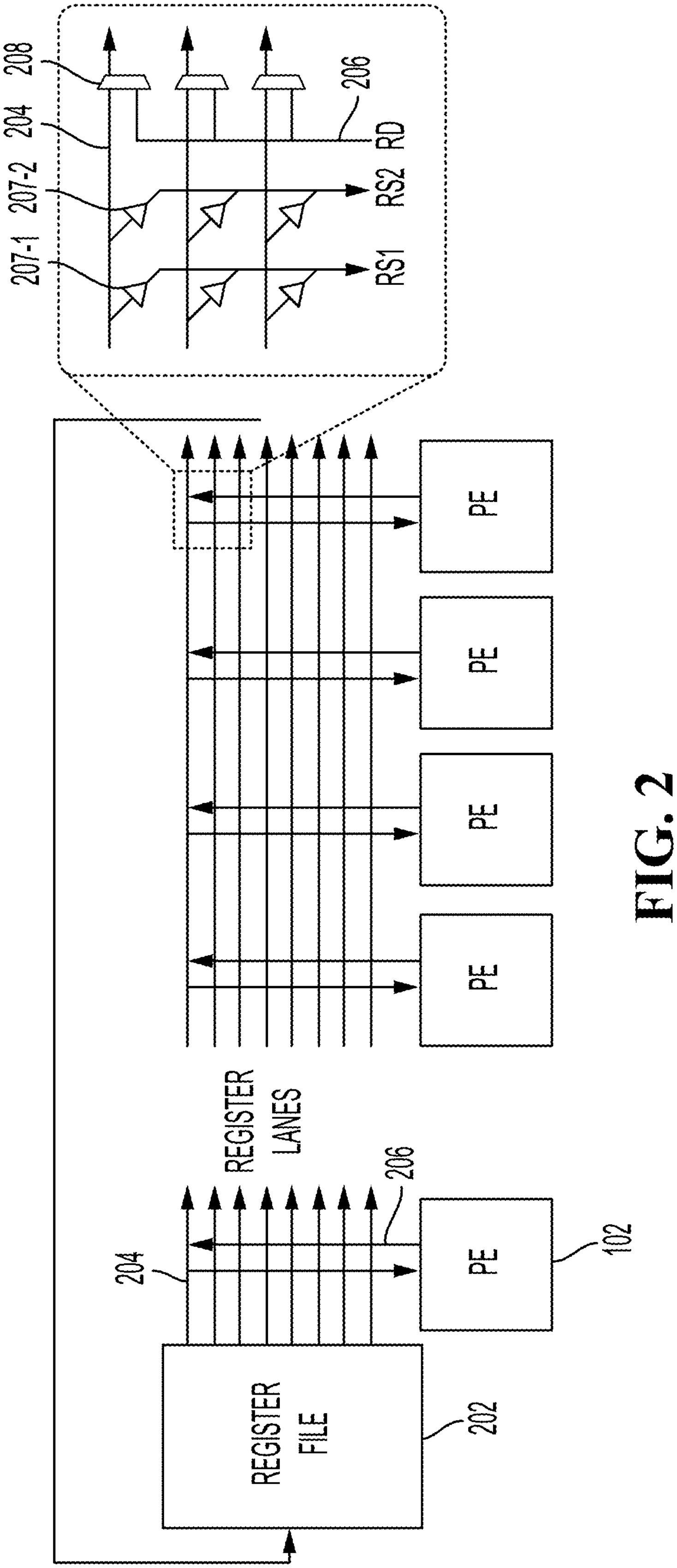
FIG. 2 is an illustration of an example dataflow-based general-purpose processor architecture including a register file, multiple register lanes, and multiple PEs according to some embodiments.

In some examples, the register file includes an array of multiple processor registers corresponding to the multiple feedforward register lanes. Referring to FIG. 2, the register file 202 is connected to multiple register lanes (e.g., feedforward register lanes 204). In some examples, each processor register in the register file 202 is connected to a feedforward register lane 204 and carries a register value to the feedforward register lane 204.

In some examples, the multiple feedforward register lanes 204 are an extension to the register file as shown in FIG. 2. In some examples, a feedforward register lane 204 is the interconnect between a PE 102 and the register file 202 or between a PE 102 and another PE. The feedforward register lane 204 can serve the combined roles of forwarding paths, the physical register file, and the reorder buffer. Each processor register in the register file 202 can be abstracted as a feedforward register lane 204 (wire bundle) that transports the value of the processor register and status across functional units (e.g., PEs). In some examples, the interconnect connects processor registers of the register file 202 into wires of the same bit-width, which can be accessed by the PE 102. For example, an instruction set architecture can include 16 processor registers in the register file 202. Each processor register is 32-bit wide and translates to 16 feedforward register lanes where each lane is a 32-bit wire with or without a valid bit. Each PE 102 reads its assigned instruction's source operands from the feedforward register lanes 204 and writes its output to the destination register lane 206.

In some examples, to support reads from a lane at each PE 102, a switch 207-1 selects between blocking a lane's current value (e.g., value on lane 204 arriving from the left in the diagram of FIG. 2) and the enabling that lane's current value to pass through as a first source operand (for RS1) to the PE. Similarly, in some examples, to support reads from a lane at each PE 102, a switch 207-2 selects between blocking a lane's current value (e.g., value on lane 204 arriving from the left in the diagram of FIG. 2) and the enabling that lane's current value to pass through as a second source operand (for RS2). In some examples, to support writes to a lane, at each PE 102, a switch 208 (e.g., multiplexer, 2-input multiplexer) selects between propagating the lane's current value (e.g., value on lane 204 arriving from the left in the diagram of FIG. 2) and the PE's output (e.g., value on RD 206 in FIG. 2). Accordingly, each PE 102 is associated with and can control a switching network of switches (e.g., including switches 207-1, 207-2, and 208 at each feedforward lane 204) to selectively couple its first source register (RS1), its second source register (RS2), and its destination register (RD) to respective lanes of the feedforward register lanes 204 (e.g., based on the instruction in the instruction register of the PE 102).

In some examples, each PE 102 includes an instruction register 112 which stores the instruction, which is assigned to the respective PE. A CPU instruction has up to two source register addresses (for RS1, RS2), and a destination register address (for RD). In some examples, which switch 207-1 is enabled to forward a value from a register lane for RS1 and which switch 207-2 is enabled to forward a value from a register lane for RS2 is determined by the source register addresses of the instruction assigned to the PE. In some examples, which multiplexer 208 selects the output from the PE (rather than propagating the prior lane) is determined by the destination register address of the instruction assigned to the PE. When a PE 102 writes to a destination register lane and the corresponding feedforward register lane, the PE 102 only changes the feedforward register lane's value for future PEs 102 (rightward of the PE 102 in the diagram of FIG. 2), not previous PEs 102 (leftward of the PE 102 in the diagram of FIG. 2). In some examples, the output of a PE 102 is configured to further carry a valid indication (e.g., a valid bit). For example, a register lane can accompany a valid bit, which is set to high when a PE 102 writes its output. The valid bit allows subsequent units to be aware that the register lane's value is ready and correct. Even though PEs 102 are assigned instructions in program order, PEs 102 can begin execution as soon as PEs' inputs are valid, exploiting any available instruction-level parallelism.

In some examples, the multiple PEs 102 include a first PE corresponding to a first assigned CPU instruction of the multiple assigned CPU instructions and a second PE corresponding to a second assigned CPU instruction of the multiple assigned CPU instructions in-order. In further examples, in response to one or more first source operands being available from the register file for the first PE and one or more second source operands being available from the register file for the second PE, the first PE and the second PE concurrently executes the first assigned CPU instruction and the second assigned CPU instruction. Thus, in the dataflow-based general-purpose processor architecture, CPU instructions are assigned to PEs in program order but can execute out-of-order as soon as the operands from register lanes are available.

Figure 3A:
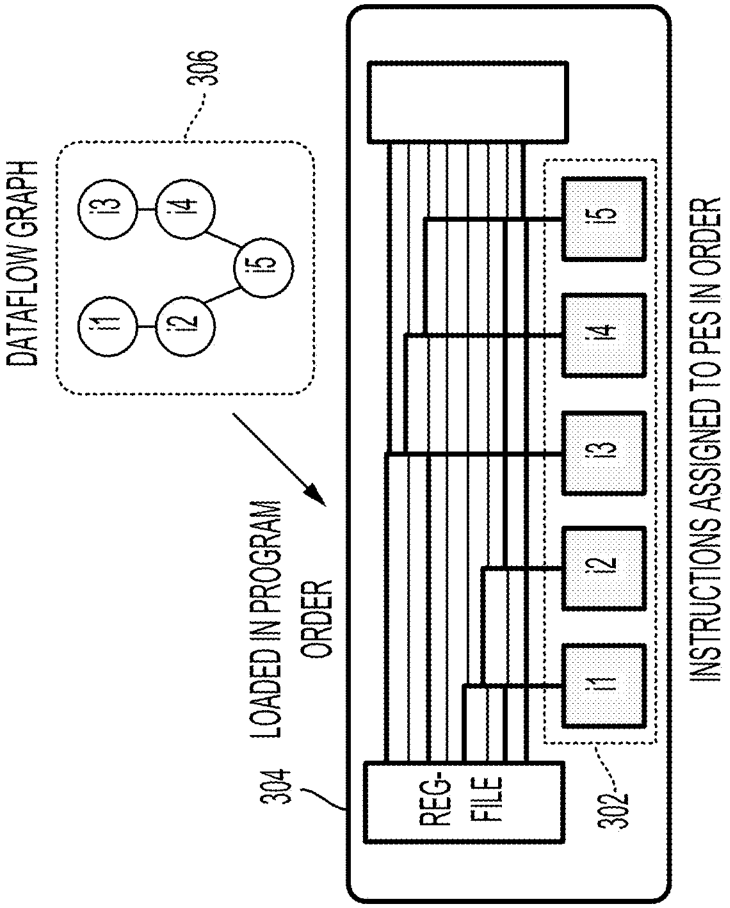
FIG. 3A is an illustration of an example assignment of instructions to PEs in-order according to some embodiments.

FIG. 3A illustrates a set of five CPU instructions 302, i1 to i5, in a dataflow-based general-purpose processor architecture according to some examples. The instructions i1 to i5 are part of a program and are ordered in the program in the following sequence: i1, i2, i3, i4, i5. In the illustrated architecture, the CPU instructions 302 are assigned to PEs from left-to-right in program order. However, it should be appreciated that the CPU instructions 302 are assigned to PEs in program order with any other direction (from right-to-left, from up-to-down, from down-to-up, etc.). FIG. 3A also illustrate the instructions 302 in a dataflow graph 306. Generally, a dataflow graph abstracts a program as a directed graph of operations, and data flows internally through edges of the graph during execution. Here, the dataflow graph 306 abstracts the CPU instructions 302 as such a directed graph of operations. In FIG. 3A, the PEs and feedforward register lanes 304 of the dataflow-based architecture form the dataflow graph 306 in that the PEs, using the feedforward register lanes 304, execute the CPU instructions 302 out-of-order according to the dataflow graph 306.

Accordingly, during execution in the data-flow general-purpose processor architecture, a dynamic datapath arises as PEs are orderly loaded with program instructions. Since register lanes (i.e., feedforward register lanes) replace the register file, a restricted dataflow graph is implicitly formed as results from previous PEs are forwarded to the next. This construction requires no reconfiguration because each PE simply loads its source operands from register lanes after its assigned instruction is decoded. On the other hand, the existing technology in FIG. 3B requires reconfiguration and explicit construction of the dataflow graph on the two-dimensional tile of PEs. Instructions can begin executing as soon as their source register lanes are valid, resolving any read-after-write (RAW) hazards. The example architecture can implicitly resolve data dependencies through its register lanes, eliminating most control structures found in other architectures.

Figure 3B:
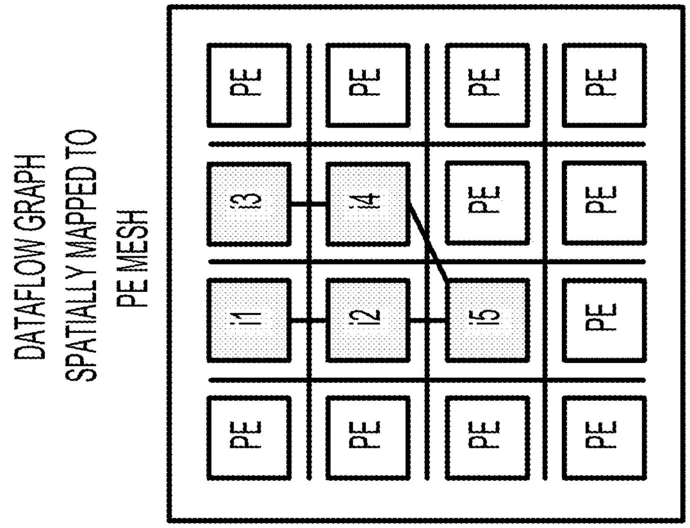
FIG. 3B PRIOR ART
FIG. 3B is an illustration of an existing assignment of instructions spatially to PEs.

In contrast to FIG. 3A, FIG. 3B shows an existing technology in which instructions are assigned spatially to a mesh of PEs, directly reflecting the dataflow graph. Such spatial assignment of instructions to a PE mesh requires reconfiguration of the PE mesh and additional control structures for the reconfiguration.

By implicitly constructing the dataflow graph, the processor architecture performs the combined tasks of renaming registers, issuing, dispatching, and re-ordering instructions. Thus, the architecture can effectively reduce the complexity of the processor's front-end at the cost of increased hardware area for sparsely enabled PEs and register lanes.

Furthermore, additional efficiencies and benefits can be realized by the architecture when the dynamically built datapath is reused across loop iterations. For example, when a backward branch or jump is encountered, one or more parts of the datapath can be reused if the target address falls within the already constructed instruction range. A reused datapath already has instructions loaded and decoded, and data dependencies between instructions resolved, effectively leaving only the execute stage for each instruction. Moreover, when a parallelizable loop that entirely fits in the dataflow general processor is encountered, the datapath can be pipelined to further improve execution efficiency. By inserting pipeline registers between PEs, the total throughput can be scaled proportionally with the number of PEs. For example, multiple PEs can reuse at least a part of the hardware datapath corresponding to the dataflow graph for a loop iteration.

In some examples of the dataflow-based general-purpose processor architecture, PEs are chained together in a line rather than arranged in two-dimensional tiles. Accordingly, all PEs can have assigned instructions regardless of the shape of the graph. In further examples, program instructions are assigned to PEs in program order, and eventually commit in-order. For example, the multiple assigned CPU instructions assigned to the multiple PEs commit in program order. In even further examples, register lanes form the interconnect between PEs, and the register lanes dynamically construct a restricted dataflow graph and serve a similar purpose as a reorder buffer. In certain embodiments, the example architecture addresses two important limitations of past works:

1. Granularity of control. Most dataflow architectures cannot fully handle control flow changes at the instruction level. They use compilers to break down a program into control-free sequences of code, e.g., 'blocks' or 'waves.' These sequences are then mapped and executed block-wise in hardware. As a result, supporting an arbitrary branch instruction or precise interrupts is difficult to realize. In certain embodiments, the example architecture does not decompose the program into subgraphs and handles control flow changes at the instruction level. The example architecture supports precise interrupts and speculative execution fully (e.g., even if all instructions in a program are nested branches).
2. General compatibility. Most dataflow architectures require special instruction sets and/or compilers and/or software libraries to work with the hardware. Thus, there is a high barrier to adoption as existing binaries for commonly used instruction set architectures must all be recompiled to work on the platform. Furthermore, granularity control limitations above only make it more difficult to support all application types. However, one way in which the example architecture differs from past dataflow architectures is that instructions are mapped in program order but execute out-of-order as shown in FIG. 3A. This not only simplifies instruction control but also allows composability. The dataflow graph in the example architecture can be viewed as a linearized version of the spatial DFG mapped to a tile of PEs.

In some examples, the dataflow graph includes multiple nodes corresponding to the multiple assigned CPU instructions and multiple edges corresponding to the multiple feedforward register lanes. The multiple CPU instructions are assigned to multiple corresponding PEs, which are physically arranged in a line on the circuit. In some examples, a first PE of the multiple PEs corresponds to a parent node of the multiple nodes in the dataflow graph while a second PE of the multiple PEs corresponds to a child node of the multiple nodes in the dataflow graph. Then, an output of the first PE can correspond to a first feedforward register lane of the multiple feedforward register lanes for a source operand of the second PE. For example, a first feedforward register lane of the multiple feedforward register lanes can form an interconnect between a first PE (e.g., a parent node) and a second PE (e.g., a child node) of the multiple PEs to form the dataflow graph. In some examples, the dataflow graph in the architecture arises naturally, and is not explicitly configured or mapped by some process.

In further examples, the dataflow-based general-purpose processor architecture can further include a switch configured to select a propagating value on the first feedforward register lane or the output of the first PE. In response to the switch selecting the output of the first PE for the first feedforward register lane, a destination register lane of the first PE corresponding to the first feedforward register lane carries the output of the first PE for the source operand of the second PE. Thus, the dataflow-based general-purpose processor architecture does not have data hazards because the output of each PE replaces the register value and valid bit for its destination register lane only for subsequent instructions. Register writes of one instruction can complete at any time without affecting the instructions prior to the register. In some examples, a first instruction being assigned to a first PE prior to the destination register of a second PE with an assigned second instruction is located closer to the register file. For example, because the first PE and the second PE are arranged in a line, the register file, the first PE with the first assigned CPU instruction, and the second PE with the second assigned CPU instruction are arranged in a line in program order of the first assigned CPU instruction and the second CPU assigned instruction. In some examples, the register file is disposed on the left, and the first PE is disposed between the register file and the second PE.

In some examples, the dataflow-based general-purpose processor architecture can adhere to the von Neumann model of computing. Thus, the architecture can be used as a drop-in replacement for regular CPUs and supports generic reduced instruction set computer (RISC)-like instruction set architectures (ISAs) without requiring its own ecosystem of specialized compilers or language. Thus, the example architecture can be the central processor with full transparency and support for existing code.

In some examples, the dataflow-based general-purpose processor architecture uses dynamic dataflow execution for serial parts of a program to minimize latency of execution. This is not an easy task considering that a major power burden of modern out-of-order processors lies in its complex front-end logic responsible for resolving control and data dependencies in the program. This overhead allows aggressive dispatching of as many instructions as it can each cycle to maximize ILP. Consequently, even for floating-point operations, a significant chunk of total power spent executing each instruction is consumed by control structures such as the register alias table (RAT), reorder buffer (ROB), and reservation stations, rather than the functional units performing the operation. The purpose of these control structures is to: 1. determine true data dependencies between instructions, 2. dispatch instructions not waiting on dependencies to functional units each cycle, and 3. maintain a table of active instructions in program order for control hazards. In certain embodiments, the example architecture uses an alternate method that accomplishes these tasks without explicit renaming or out-of-order issue by building a restricted dataflow graph of the program dynamically in hardware. However, the graph need not be spatially mapped to a processor array, or be physically constructed. Instead, it arises naturally when instructions are laid out sequentially.

Figures 4A, 4B, 4C:
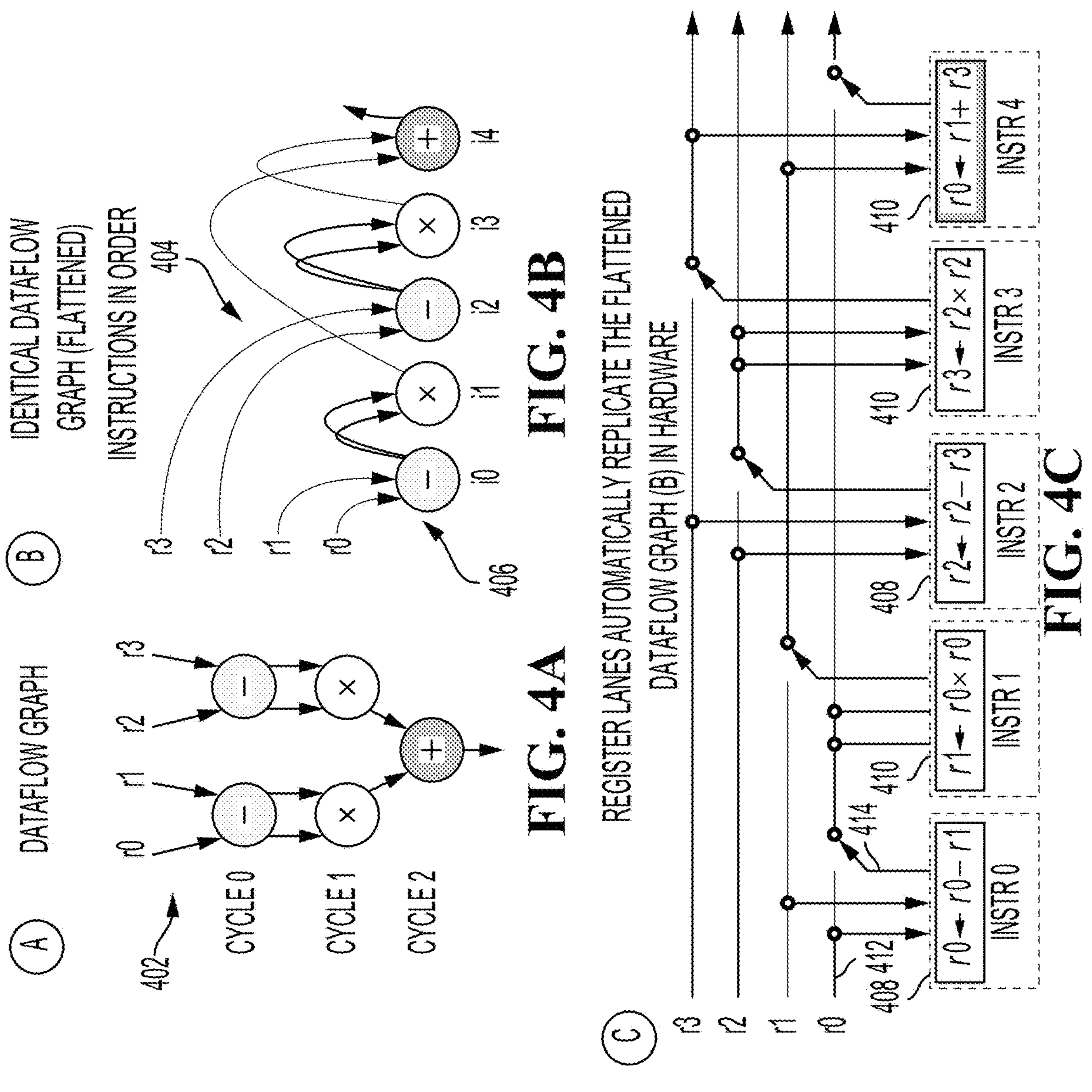
FIG. 4A is an illustration of an example dataflow graph.
FIG. 4B is an illustration of a flattened dataflow graph of the dataflow graph of FIG. 4A.
FIG. 4C is an illustration of an example register lanes automatically replicating the flattened dataflow graph of FIG. 4B according to some embodiments.

In some examples, a restricted dataflow graph of the program is dynamically and implicitly constructed in hardware. Viewed from a higher abstraction level, the row of PEs corresponds to computation nodes in the graph. Register lanes that are read and written correspond to edges in the graph. To better illustrate this concept, FIGS. 4A-4C show a simple example program that computes the Euclidean distance between two points. For simplicity, the example architecture has four registers available for use. FIG. 4A shows the dataflow graph of the program with all dependencies between instructions. If each operation can be completed in a one cycle latency, the program completes in three cycles. FIG. 4B shows a flattened dataflow graph 404 flattening the same dataflow graph 402 from FIG. 4A by laying out instructions 406 in program order while all edges remain unchanged. FIG. 4C shows the design including register lanes automatically replicating the flattened dataflow graph 404 of FIG. 4B. The diagram in FIG. 4C simplifies the hardware and omits unused multiplexers. In FIG. 4C, PEs 408, 410 are assigned instructions in program order (i0 to i4 or Instr. 0 to Instr. 4). Each PE 408, 410 reads its inputs from the register lanes 412, and writes its output to the destination lane 414, overwriting its value and valid bit for subsequent PEs 410. Even though PEs 408, 410 are assigned instructions in program order, PEs 408, 410 can begin execution as soon as all inputs are valid. In the first cycle, both i0 and i2 have valid inputs from the register lanes and can begin execution. On the other hand, i1 cannot begin because it takes register r0 as input, and the r0 lane is overwritten by i0 whose output is currently invalid until it completes. Execution completes when all register lanes are valid at the last PE. Thus, the example architecture in FIG. 4C once again can complete execution in three cycles, identical to the ideal case. Further, FIG. 4C illustrates that the same dataflow graph shown in FIG. 4B is implicitly constructed, which, as noted, is a flattened view of the original DFG shown in FIG. 4A.

False register dependencies, namely write-after-read (WAR) and write-after-write (WAW) hazards do not obstruct ILP in the example dataflow-based general-purpose processor architecture. Normally, a register value cannot be overwritten if prior instructions still require the old value, but this is no issue for register lanes flowing in one direction. In the architecture, the output of each PE replaces the register value and valid bit for its destination register lane only for subsequent instructions. Hence, register writes of one instruction can complete at any time without affecting the instructions prior to it. If unobstructed by control hazards, the example architecture can exploit all locally available ILP. If a program has instructions that are all independent, the example architecture can schedule as many instructions as there are PEs in one cycle, achieving an issue width that scales with the number of PEs.

Figure 5:
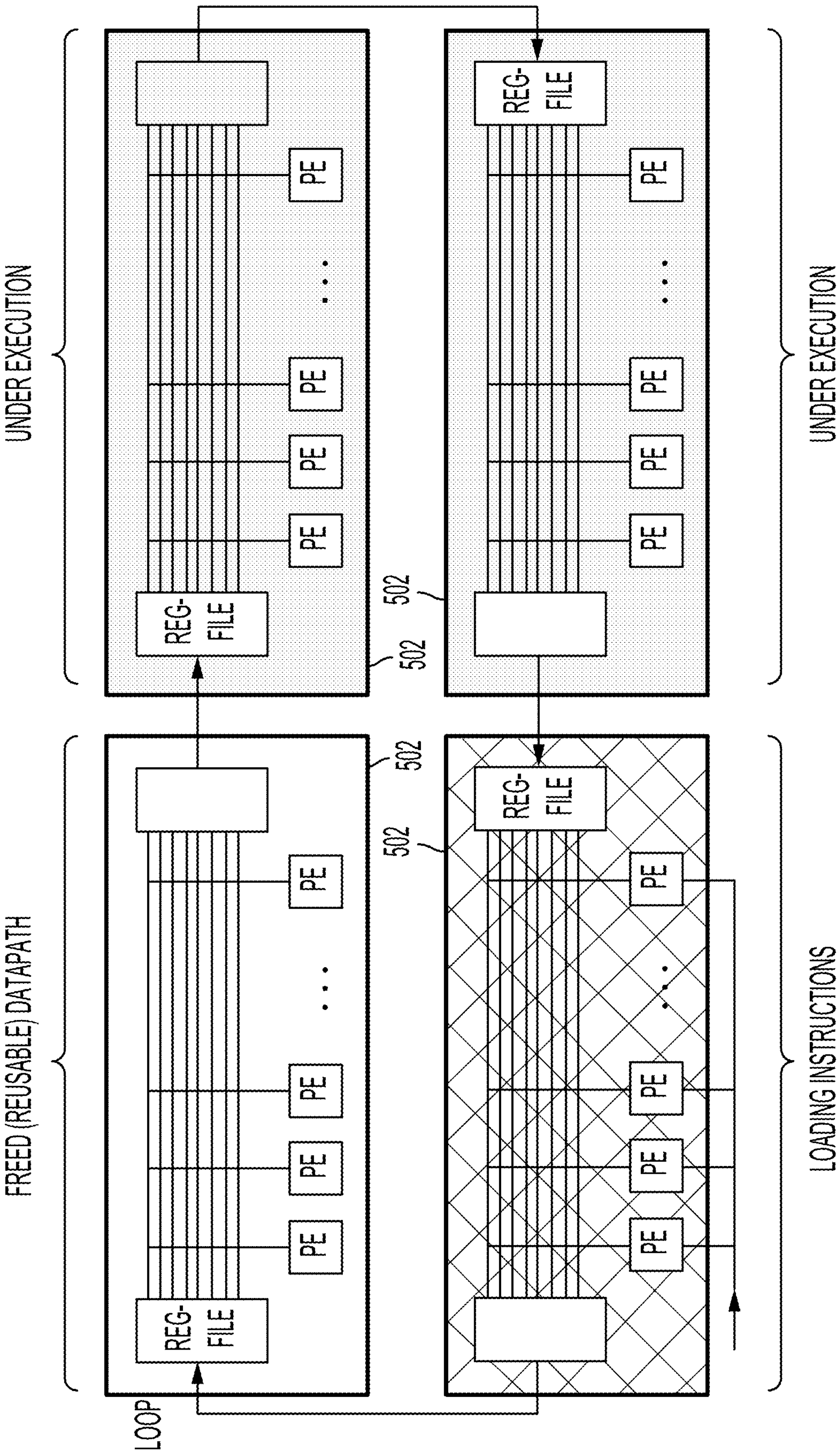
FIG. 5 is an illustration of multiple example processing clusters chained together according to some embodiments.

To support control flow changes such as branches and jumps in the program, in certain embodiments, the long row of PEs can be divided into parts called processing clusters. This division is transparent to register lanes, whose values and control bits can be connected from one cluster to another with a buffer in between. FIG. 5 shows a design with 4 processing clusters 502 that are chained in a circular connection. Under serial execution where the program counter (PC) increments by one word every cycle, the architecture can load instructions into the next cluster while the current clusters execute. A cluster 502 can be considered freed (and ready to receive further instructions) if all PEs in the cluster 502 have completed their instructions. Thus, although four clusters are illustrated in FIG. 5, in some examples, two clusters are provided, which is sufficient to alternate between. The number of clusters is not limited to four and can be any other suitable number (e.g., 2, 3, 5, 6, etc.). In some examples, instructions are assigned in program order, and loading a single 64-Byte instruction cache line is enough to fill a 16 PE cluster in a 32-bit architecture.

Figure 6:
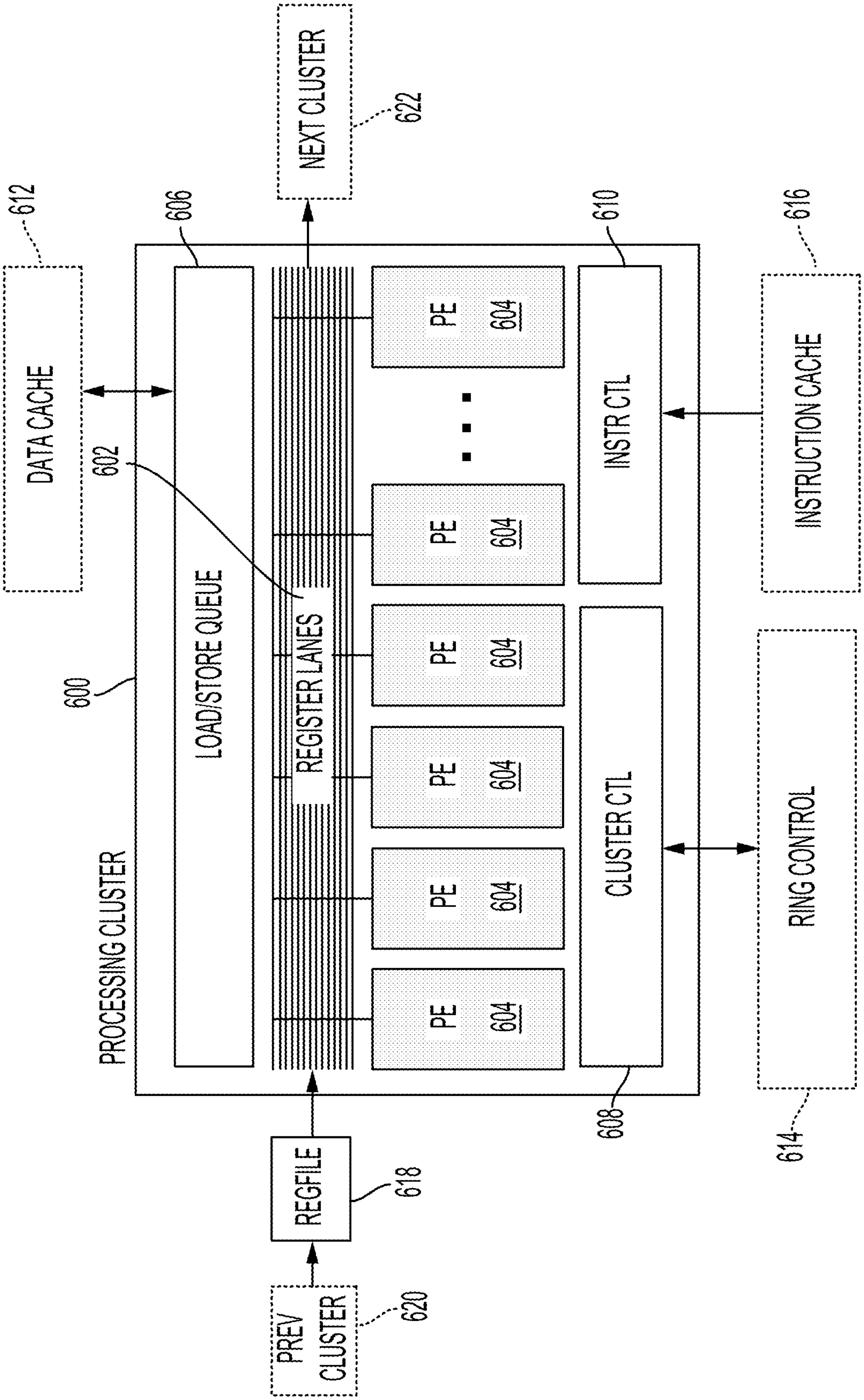
FIG. 6 is an illustration of an example processing cluster according to some embodiments.

FIG. 6 shows a processing cluster 600 including multiple register lanes 602 and PEs 604. The processing cluster 600 can further include a load/store queue 606, a cluster control circuit 608, and/or an instruction control circuit 610. In some examples, the load/store queue 606 can receive or provide instructions from a data cache 612. In further examples, the cluster control circuit 608 and the instruction control circuit 610 can communicate with a ring control circuit 614 and an instruction cache 616, respectfully. In further examples, a register file 618 can be connected to the register lanes 602 and/or a previous processing cluster 620. The register lanes 602 can be connected to a next processing cluster 622. In some examples, multiple PEs is grouped into a first processing cluster corresponding to a first subset of the plurality of assigned CPU instructions and a second processing cluster corresponding to a second subset of the multiple assigned CPU instructions. In response to executing the first subset of the multiple assigned CPU instructions, the second subset loads the second subset of the multiple assigned CPU instructions.

Referring again to FIG. 1, the PC lane 122 can cross every PE 102 in a cluster. As instructions are simultaneously executing in the cluster, the PC 120 crosses each instruction in program order allowing completion of memory stores (retiring instructions). As noted above, the PC 120 is normally incremented (e.g., by 4) in each PE it passes (without actual addition), unless, for example, the PC 120 encounters a branch or jump instruction.

Figure 7A:
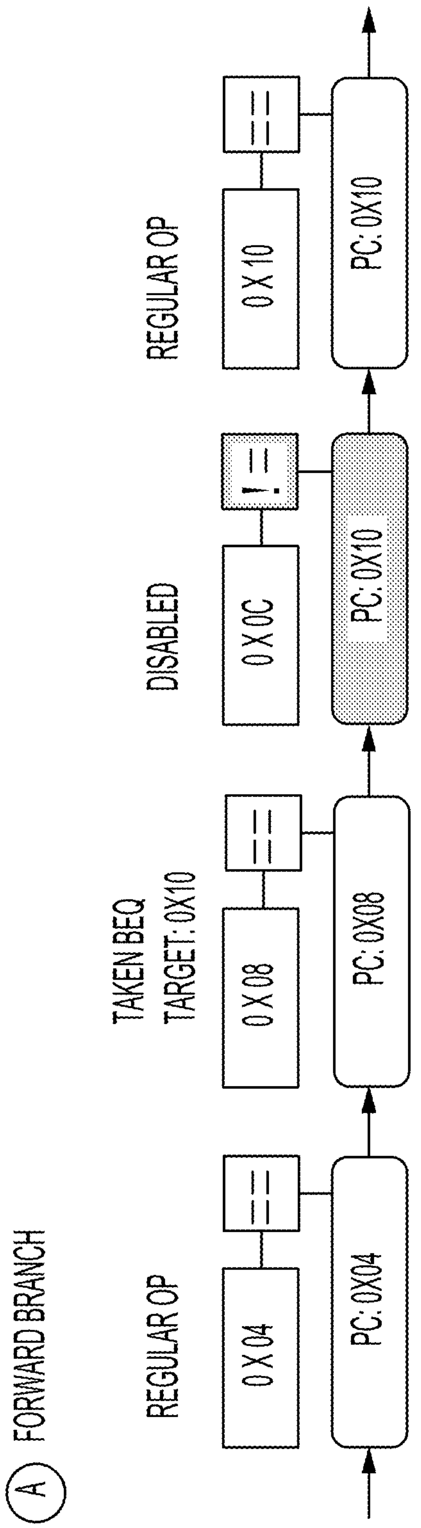
FIG. 7A is an illustration of an example forward branch according to some embodiments.

A positive offset jump or branch, referred to as a forward branch, that is taken modifies the PC lane and sets its value to the jump or branch target address. As a result, the subsequent PEs' instruction addresses will no longer match the PC lane. This mismatch disables the functional unit and allows the PC lane to bypass all PEs until the next match is encountered. An example is shown in FIG. 7A, where the third instruction (0x10) is skipped by the branch instruction. If the target address lies outside the current processing cluster, the next cluster will load the instructions at the target address.

Figure 7B:
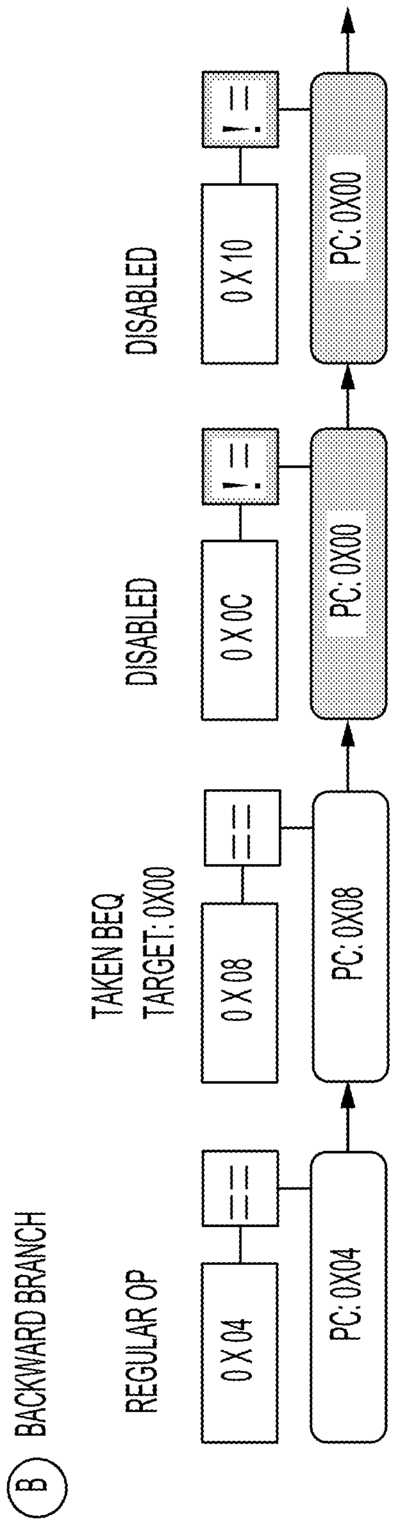
FIG. 7B is an illustration of an example backward branch according to some embodiments.

A backward branch is handled in mostly the same way as forward branches. FIG. 7B shows an example of a backward branch that is taken. As before, subsequent instruction addresses will not match the modified PC lane and will be disabled. However, in the case that the target address is in a cluster already present in the processor, such as the case shown earlier in FIG. 5, the dynamic datapath that is already constructed for the current loop can be reused. This enables instruction reuse and eliminates the overhead of instruction fetching and decoding. If the target address does not fall within the range of any cluster, instructions can be loaded from the instruction cache again.

In some examples, thread pipelining targets parallel parts of a program with the goal of maximizing throughput. The dataflow architecture can be extended by pipelining register lanes so that possibly all PEs are active when the pipeline saturates. In some examples, if two different threads that can run concurrently, the example architecture can use spatial parallelism to dedicate multiple rows of processing clusters to execute each in parallel, similar to multicores. If two threads are identical but process different data, the example architecture can additionally use temporal parallelism, i.e., thread-level pipelining to further improve execution efficiency.

Thread pipelining in a single instruction, multiple thread (SIMT) pipeline is similar to loop pipelining where different iterations of a loop execute at different stages of the pipeline, though each iteration is still executed sequentially. The SIMT pipeline may be visualized as a generalization of the traditional instruction pipeline in microprocessors.

Figure 8A:
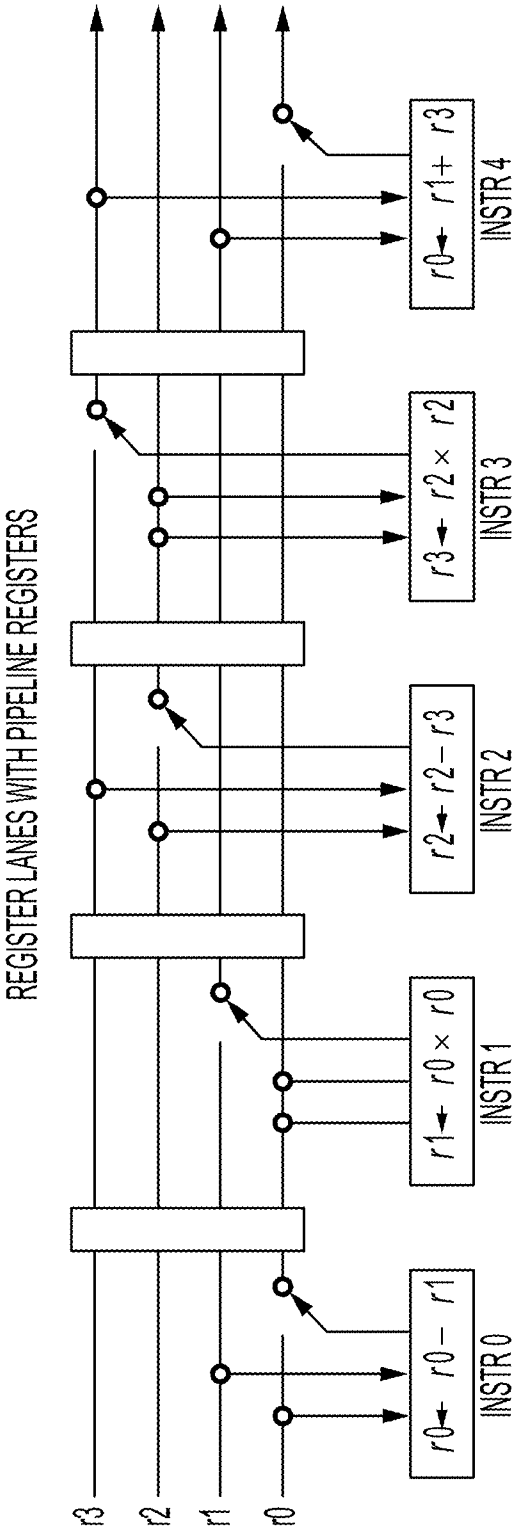
FIG. 8A is an illustration of an example register lanes with pipeline registers for thread pipelining according to some embodiments.
Figure 8B:
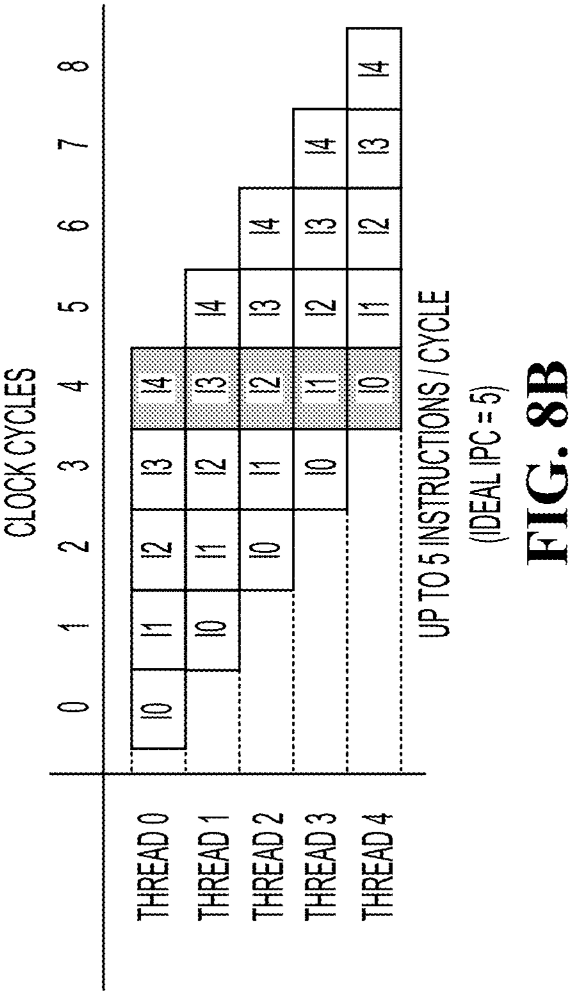
FIG. 8B is an illustration of an example clock cycles for thread pipelining according to some embodiments.

In the classic 5-stage pipeline, each instruction is broken down into five parts from fetch to write-back. Each pipeline stage can include dedicated hardware logic for one part. When a program runs, instructions flow through the pipeline and, if there are no stalls, the pipeline achieves a cycles per instruction (CPI) of exactly 1 with all stages busy. Though instructions are overlapped, each instruction's parts are always performed in correct order, i.e., no instruction will be decoded before fetched or executed before decoded. In some examples, a pipeline can be constructed for threads rather than instructions. Rather than breaking down instructions into parts, threads can be broken down into instructions. This break down is possible because the example architecture exploits instruction reuse to reduce each instruction to only the execute stage. Thus, each pipeline stage now executes a complete instruction, and each thread, carrying its register file, flows through the pipeline to complete execution as shown in FIGS. 8A and 8B. In some examples, the dataflow design can be modified to support thread pipelining by inserting pipeline registers 802 between functional units. This graph is exaggerated to illustrate pipeline registers inserted between every PE. In some examples, a pipeline register file can be inserted between a first processing cluster and a second processing cluster as shown in FIG. 5. PEs are assigned instructions of the thread in program order, however, from the perspective of each executing thread, its instructions are also executed in original program order.

A benefit of instruction pipelining is an ideal CPI of 1 with temporal parallelism. In the case of thread pipelining shown in FIG. 8B, one thread per cycle can be ideally executed, provided there are no stalls and enough PEs for all instructions. It follows that the ideal instruction throughput (IPC) achieved by the pipeline scales linearly with the number of PEs available. If the thread has fewer instructions than available PEs, the pipeline can be spatially replicated across clusters to maximize utilization of resources.

Data Hazards. In some examples, while parallel threads can be executed in any order, instructions within each thread execute strictly in program order as it flows through the pipeline as shown on the right side of FIG. 8B. For each thread, i0 executes before i1, then it before i2, and so on. Accordingly, execution results in no data hazards.

Control Hazards. Thread pipelining has constraints that limit its applicability to all types of parallel programs. Firstly, the architecture may not have enough PEs to fit all instructions of the thread. Secondly, a thread is not permitted to have backward jumps or conditional branches (e.g., nested loops). If they exist, they can be fully unrolled, otherwise thread pipelining can be disabled. A backward branch might not be pipelined since past PEs are concurrently used by other threads. However, forward branches are easily handled since each thread carries its own PC through the pipeline. Like before, each PE is enabled when its instruction address matches the thread's PC. When a branch instruction is encountered and the branch is taken, the thread's PC is modified to the branch target address, effectively nullifying the subsequent instructions until the correct address is reached. Thus, control divergence is not as significant a problem for this architecture as it is in vector and single instruction, multiple data (SIMD) processors.

Architecture. The general architecture of an embodiment of the dataflow-based general-purpose processor architecture includes its control and memory subsystem. Much of the dataflow-based general-purpose processor architecture can be parametrizable with a multitude of possible designs. An architect can optimize it for performance and efficiency in specific use cases. Although an implementation supports the RISC-V 32-bit ISA, the dataflow-based general-purpose processor architecture is intended to be ISA agnostic and works reasonably well with most general-purpose instruction sets.

Figure 9A:
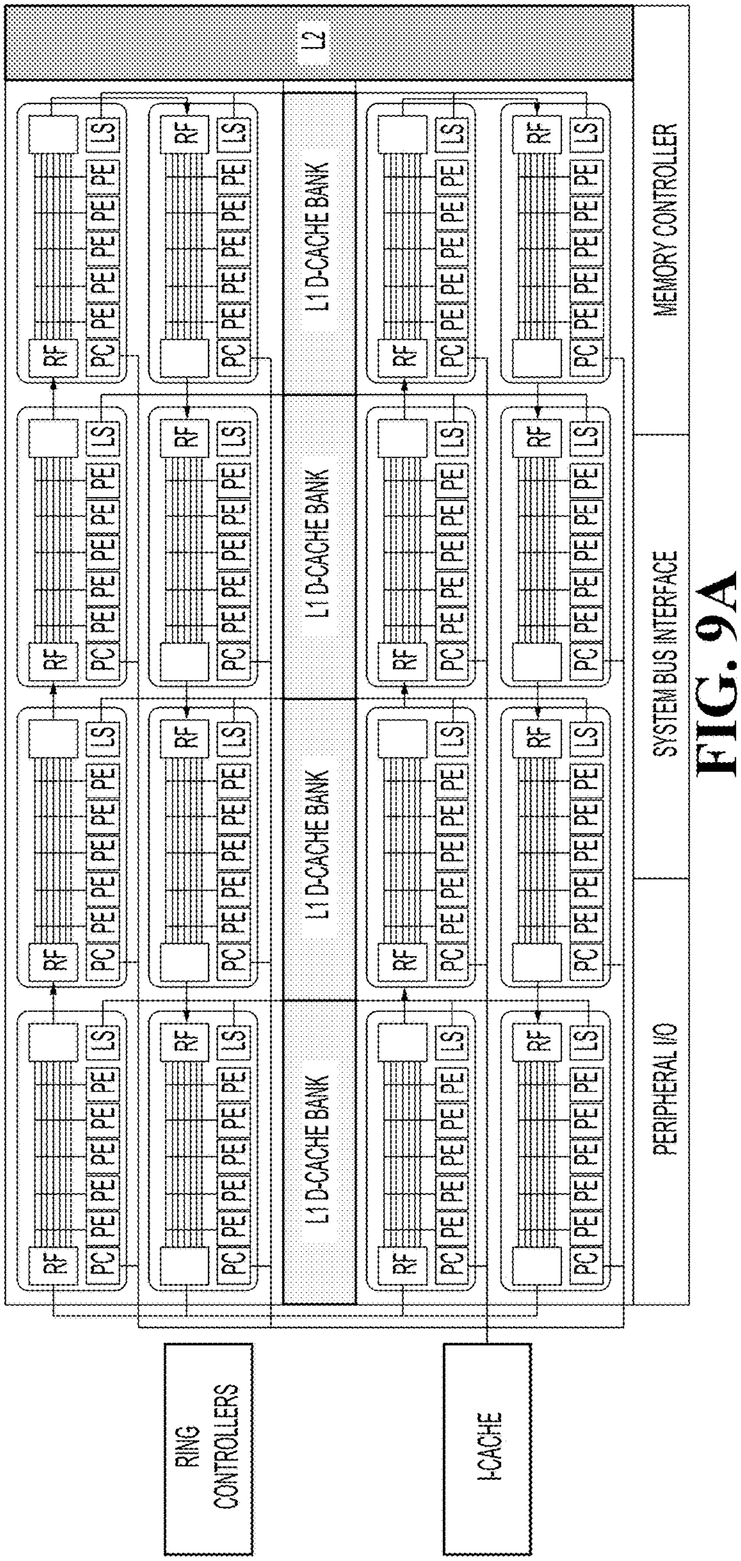
FIG. 9A is an illustration of an example high-level dataflow-based general-purpose processor architecture organization according to some embodiments.
Figure 9B:
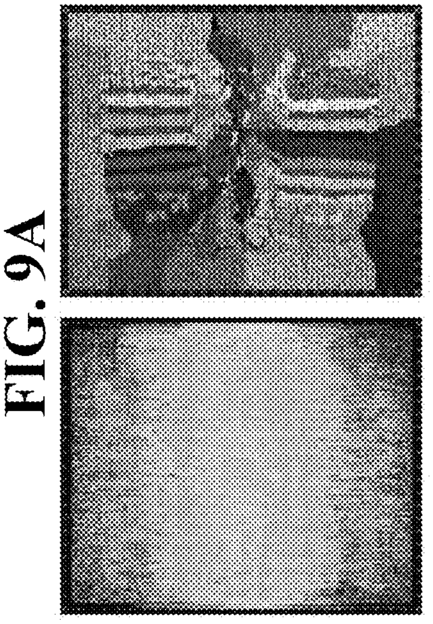
FIG. 9B is an illustration of example clock cycles for thread pipelining according to some embodiments.

Overall organization. A high-level architecture diagram of an embodiment is depicted in FIG. 9A. FIG. 9B shows an example reduced instruction set computer V (RISC-V) processor with 2 clusters with 16 PEs (caches not shown) synthesized with a 45 nm technology library. In some examples, the dataflow-based general-purpose processor architecture is organized hierarchically by the following hardware divisions: dataflow rings, which contain processing clusters, which contain individual PEs. A dataflow ring is analogous to a CPU core. It connects multiple clusters together and is the smallest hardware unit that a program can run on. Each ring is independently equipped with a control unit responsible for handling instruction fetches to its clusters, activating and freeing clusters, and managing thread-level control tasks. In some examples, multiple rings can be chained together to form a larger ring with a longer datapath. A dataflow-based general-purpose processor architecture can thus have multiple ring configurations to exploit different types of parallelism. Each processing cluster can contain a row of PEs. Individual loads and stores are queued at the level of the processing cluster. Likewise, branch, jump, and call instructions whose target addresses fall outside the current cluster are also handled at the cluster level.

Instruction Fetching. In some examples, instructions are fetched at the granularity of I-Cache lines and are assigned in program order to PEs in a cluster. In some examples, each processing cluster can hold exactly one instruction cache line, note that I-Cache lines and register lanes can share the same on-chip bus or network for data transport. For example, the dataflow-based general-purpose processor architecture implementation may have 16 PEs per cluster and 64-Byte cache lines; thus, a single line can fill all PEs in a cluster assuming each instruction is 32-bit. A processing cluster can begin execution as soon as instructions are decoded, which takes one cycle after they are assigned to PEs. When the PC is branched to an instruction address not aligned to the cache line, the entire line can be fetched and loaded to the cluster regardless. Instructions prior to the target address will be automatically disabled due to PC mismatching the instruction address.

Processing Elements. In some examples, since each PE is assigned only one instruction to execute at a time, its implementation can be considered as either a general-purpose ALU/FPU or a fine-grained reconfigurable compute unit. Using reconfigurable logic has the advantage of reduced hardware area, but may negatively impact frequency. In one prototype, the architecture includes a generic 32-bit integer ALU and FPU with some shared computation logic.

Centralized Control. In some examples, while control transfer instructions are handled within each cluster, a control unit for each dataflow ring keeps track of instruction assignments to each cluster and execution progress. This unit maintains a hardware scheduling table that stores the head and tail clusters in use for each thread as well as their statuses. Its tasks include preemptively loading instruction lines, freeing completed clusters, and tracking PC. An on-chip bus or network is used to transport partial register files from clusters that are not directly connected for backward branches. As previously noted, this bus is also shared for loading I-Cache lines to clusters.

Interrupts and Exceptions. In certain embodiments, since instructions are mapped to PEs in program order, the dataflow-based general-purpose processor architecture can easily support precise interrupts. The architecture's register lanes serve a similar purpose as a reorder buffer in an out-of-order processor. As an example, when an interrupt is encountered at instruction i, all instructions from i+1, i+2, . . . may be automatically disabled because the PE for instruction i modifies the PC lane to the target trap vector causing subsequent PEs have a PC mismatch. The previous instructions can write their values to the current processing cluster's register file. The next cluster is then loaded with instructions at the target PC, beginning the interrupt sequence. The same process can apply to a branch misprediction; PEs can execute at will, but the PC lane essentially retires instruction in order like a reorder buffer.

Memory subsystem. A robust memory subsystem can benefit the overall performance of the example processor architecture. Under thread pipelining, this is further amplified since a missed load stalls the entire pipeline. In certain embodiments, the example architecture can use a hierarchy of memory lanes, cluster-level caches, banked L1 D-Caches, and a larger last-level cache. Memory accesses in each functional unit are checked against memory lanes, then routed to a load store unit at the cluster level, where the previously accessed line is stored. If missed, the request is queued and then sent to access the banked L1 D-Cache, where a secondary arbiter manages incoming requests from processing clusters. The L1 D-Cache in this case is technically a second level cache, and we choose a size in the range of 32-128 KB depending on the configuration. Locally, at each cluster, the example architecture can use memory lanes, which are essentially set-associative register lanes that transports memory data from PE to PE and enable access reordering. Data written by stores are temporarily stored in memory lanes that are passed to succeeding clusters and PEs for immediate access. In some examples, the memory is further optimized because, for example, with instruction reuse, each PE is assigned a single memory instruction whose address likely changes in a fixed pattern each iteration. In some aspect, localized stride prefetching and more advanced techniques will be effective in the dataflow-based general-purpose processor architecture.

Comparison with superscalar CPUs. Through experimentation, data was generated for comparing aspects of an embodiment of the dataflow-based general-purpose processor architecture against typical out-of-order CPUs to highlight its benefits and drawbacks. How each instruction is processed in a standard CPU and in the dataflow-based general-purpose processor architecture is summarized in Table 1. The second column shows the case for a purely serial program and the third column shows the case when a parallelizable loop fits on the dataflow-based general-purpose processor architecture. Dataflow execution can theoretically achieve the performance of a wide out-of-order core without needing most of its control structures.

TABLE 1

Comparison with out-of-order processor.

| Stages and Structures | Out-of-Order Processor | Example architecture (Initial) | Example Architecture (Reuse) |
|---|---|---|---|
| Fetch | Yes | Yes (Batch) | No |
| Decode | Yes | Yes | No |
| Issue | Yes | No | No |
| Issue Width | 4-8 Instr. | Scalable | Scalable |
| Rename | Yes | No | No |
| Register File | Physical RF | Reg Lanes | Reg Lanes |
| Dispatch | Yes | No | No |
| Execute | Yes | Yes | Yes |
| Commit | Reorder Buffer | Reg Lanes | Reg Lanes |

ISA Extensions. In some examples, the RISC-V ISA can be extended with two additional instructions to enable thread-level pipelining:

simt_s, rc, r_step, r_end, interval. These instructions spawns multiple loop instances by retaining the current register file in the cluster with the exception of the control register rc. This instruction is followed by a simt_e instruction that is offset by 1_offset and denotes the end of the current pipelined loop. The value and type of r_step determines how the control register changes and r_end determines the ending condition. Threads are initiated once every interval cycle.

simt_e, rc, r_end, l_offset. This instruction is used to mark the end of the current pipelined region, does not propagate all but the last thread's register lanes to the next processing cluster when the terminating condition is met. These instructions are inserted at the beginning and end of parallelizable loops. Currently, loops that can be pipelined in the example architecture (without negative offset branches) can be identified manually due to numerous restrictions.

Hardware implementation. In the following example hardware implementation, a parametrizable example processor prototype is implemented in SystemVerilog to evaluate its performance. The evaluation targeted the RISC-V 32-bit (RV32I) instruction set with optional multiplication (−M) and floating-point (−F) extensions. Table 2 lists the different hardware configurations used for evaluation.

TABLE 2

Example architecture configuration used for evaluation.

| Configuration | I4C2 | F4C2 | F4C16 | F4C32 |
|---|---|---|---|---|
| ISA | RV32I | RV32IMF | RV32IMF | RV32IMF |
| PEs/Cluster | 16 | 16 | 16 | 16 |
| Total Cluster | 2 | 2 | 16 | 32 |
| Total PEs | 32 | 32 | 256 | 512 |
| Freq. (Sim.) | N/A | 2.0 GHz | 2.0 GHz | 2.0 GHz |
| Freq. (Syn.) | 10 MHZ | 1.0 GHz | 1.0 GHZ | 1.0 GHz |
| L1I Cache Size | 32 KB | 32 KB | 32 KB | 32 KB |
| L1D Cache Size | 32 KB | 64 KB | 128 KB | 128 KB |
| L2 Cache Size | N/A | 4 MB | 4 MB | 4 MB |

Hardware Synthesis. The hardware design was synthesized using Synopsys Design Compiler L-2016.03-SP1 with a FreePDK 45 nm library. In this example, Synopsys IC Compiler was used to perform basic place and route of the synthesized design for more accurate area and power estimations. Table 3 shows hardware area and power consumption breakdown of some key components in the example architecture, hierarchically. The L1 and L2 caches are modeled separately with CACTI and are not present in the hardware design.

TABLE 3

Hardware area and power breakdown by component. Estimations are not entirely from synthesis.

| Component Name | Hardware Area | Total Power |
|---|---|---|
| F4C32 (TOP) | 93.07 $mm^2$ | 74.30 W |
| PCLUSTER | 2.208 $mm^2$ | 2.104 W |
| PE (w/FPU) | 97014 $\mu m^2$ | 120.4 mW |
| REGLANE | 15731 $\mu m^2$ | 3.063 mW |
| INT ALU | 1375.4 $\mu m^2$ | 0.774 mW |
| FPU (MUL/DIV) | 66592 $\mu m^2$ | 105.2 mW |
| RV_DECODER | 244.6 $\mu m^2$ | 0.019 mW |

Hardware Area. Area is dominated by floating-point units that each occupy 68% of a PE and together occupy 48% of a processing cluster. Register lanes account for 16.3% of a processing cluster. In the example design, register lane accesses are synthesized as a chain of simple MUXes. In some examples, a custom physical design with shared read wires can greatly reduce both area and delay. The area cost of each PE is almost $10^5$ $\mu m^2$ and each cluster around 2 $mm^2$ For a 64-bit design, the inventors can first multiplex only the registers that are accessed by the current cluster. For example, a cluster with 16 instructions can at most access 32 different registers. Hence, the original 32 register lane design can still be used with some modifications.

Circuit Timing. Timing is met at 1.0 GHz for a processing cluster with register lanes buffered every 8 PEs. The critical path in the cluster is the longest path on the register lane running from the first PE output to last PE's input within the cluster. Each lane passes through a 2-input MUX at each PE multiplexing the current value and write value. Thus, in this example, for a cluster with 16 PEs, a full register buffer is inserted on all lanes between PE 8 and 9. Timing was passed with a 2.0 GHz clock with a fixed two cycle delay from first to last register lanes, which may be used because integer ALUs can run at a higher frequency. The example architecture circuit is fully synchronous and all PEs across each cluster share the same clock domain.

Dynamic Power. Power consumption numbers are reported in Table 3 which assumes all PEs are powered on every cycle. However, during execution, PEs may only be enabled when they execute after all input operands are available; they may be clockgated in a similar fashion to FPUs in a regular processor.

Evaluation. The dataflow-based general-purpose architecture's performance and energy efficiency were evaluated using benchmarks from the *Rodinia* and SPEC CPU2017 benchmark suites against a 12-core 8-issue out-of-order ARM CPU baseline.

Methodology. Hardware performance is modeled with RTL simulation using ModelSim on the F4C2, F4C16, and F4C32 configurations in Table 2. The hardware prototypes do not have a full support of required system instructions. Accordingly, non-profiled or non-critical sections of benchmark code were modified, deleted, and circumvented to avoid all system calls. The modified benchmarks are then cross-compiled to ARM and to RISC-V with the architecture's extensions inserted if applicable. For power estimations, component utilization was recorded each cycle in the RTL testbench. A disabled processing element or floating-point unit is assumed to be clockgated, which was assumed not to consume dynamic power unless the instruction activates it. The total energy consumed was estimated based the fraction of dynamically active components each cycle. The gem5 simulator was used in Syscall Emulation (SE) mode to model an ARM CPU baseline (due to issues with RISC-V in the simulator). The ARM baseline runs at the same frequency and is aggressively configured to issue, dispatch, and retire up to 8 instructions with a 2-cycle latency for each of these stages. A similar memory hierarchy of 64 KB L1 and 4-8 MB unified L2 is selected for the ARM processor. Power consumption for simulation is estimated using McPAT. To improve simulation speed, the SystemVerilog testbench module used for simulation is less detailed compared to the full design used for synthesis. Floating-point operations are modeled as fixed delays and performed with non-synthesizable real variables, and caches are also only modeled functionally with delays. Some benchmarks are not simulated in full due to speed limitations of RTL simulation, and results are projected based on a smaller input run. However, given the general regularity of these applications, we have tested various input sizes to check that projected results are reasonable.

Figure 10A:
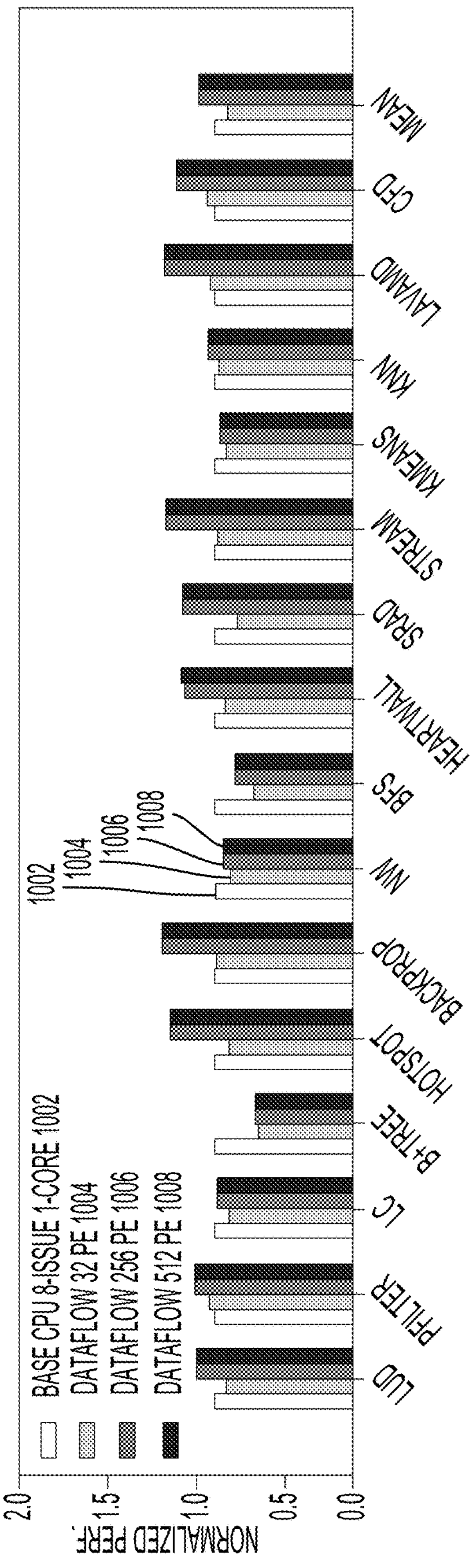
FIG. 10A shows single-thread performance results of *Rodinia* benchmarks according to some embodiments.

Single and Multi-Thread Performance. FIG. 10A shows performance results of *Rodinia* benchmarks running with one thread. Overall, the average performance of the example architecture is 0.91×, 1.12×, and 1.12× compared to the baseline CPU 1002 for configurations with 32 PEs 1004, 256 PEs 1006, and 512 PEs 1008, respectively. Much like large ROB sizes, no noticeable improvement can be gained with more than 256 PEs 1006 for serial programs.

Figure 10B:
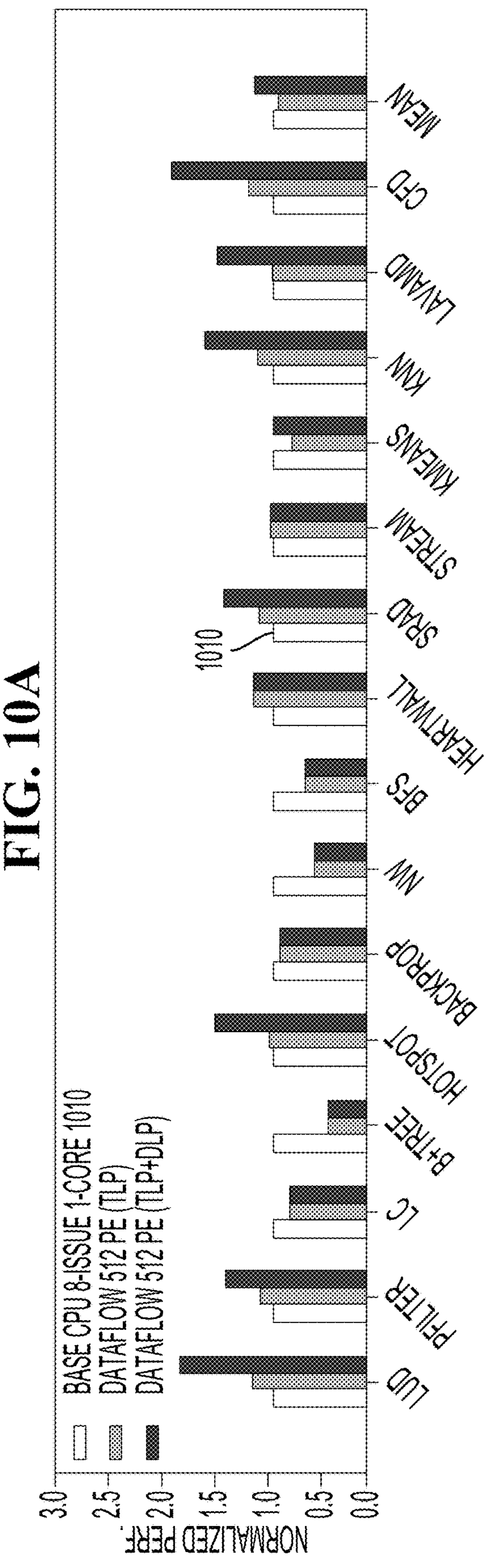
FIG. 10B shows multi-thread performance results of *Rodinia* benchmarks according to some embodiments.

In the multi-threaded case, the example architecture is simply configured to run in 16-by-2 format, i.e., each thread is allocated to a dataflow ring with two clusters to alternate between. The single-thread results show that 32 PEs 1004 is enough to extract most of the available instruction-level parallelism (ILP), however instruction reuse is all but sacrificed. Thus, to exploit thread-level parallelism (TLP), the example architecture was configured to concurrently run as many instances as possible. FIG. 10B shows multi-thread performance result against the CPU baseline 1010. The bar 1010 indicates temporal parallelism (SIMT pipelining) applied in addition to spatial parallelism with multiple threads. Program regions in applicable benchmarks were manually identified or modified to enable thread pipelining while maintaining correctness. Performance was slightly slower (0.95× on average) compared to the ARM CPU but elevates to 1.2× with thread pipelining enabled. The multi-core CPU retakes its advantage in most benchmarks where SIMT pipelining was not additionally applied. Accordingly, in some examples, the example architecture is configured with enough PEs to exploit reuse in most workloads to unlock its potential with thread pipelining. This performance degradation is also largely attributed to memory stalls due to load congestion, especially in the initial segments of the benchmark kernels.

Figure 11A:
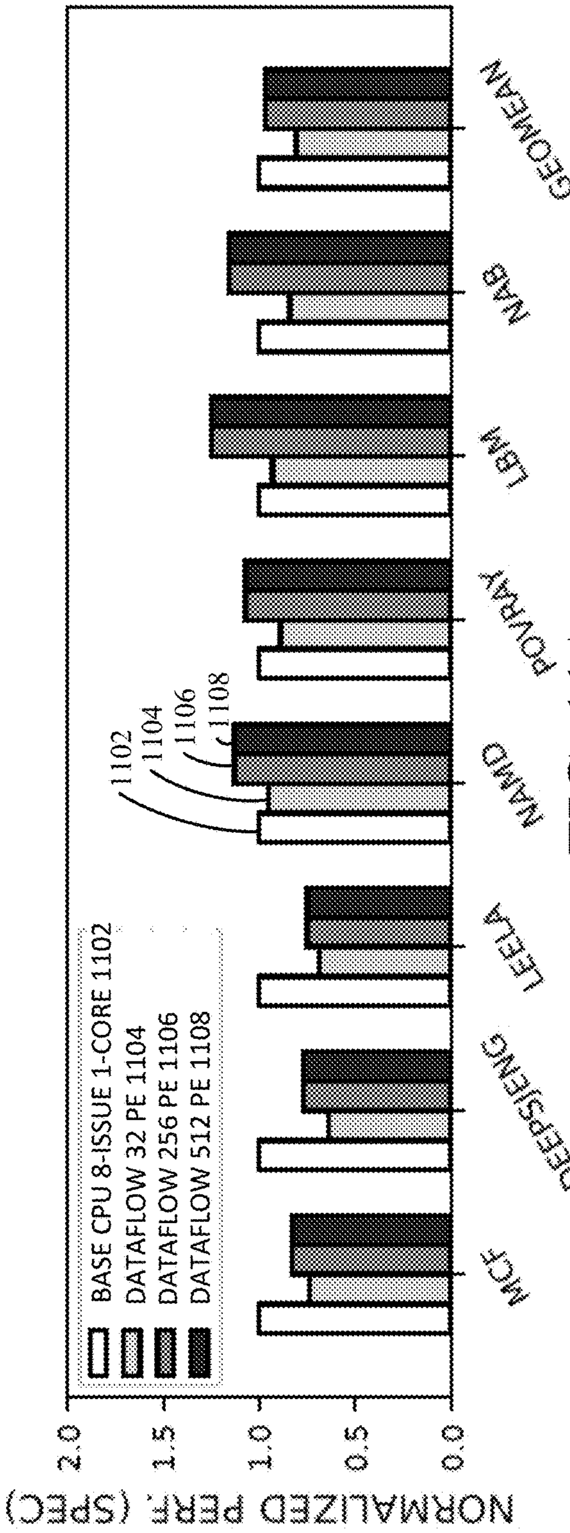
FIG. 11A shows single-thread performance results of SPEC CPU® 2017 according to some embodiments.
Figure 11B:
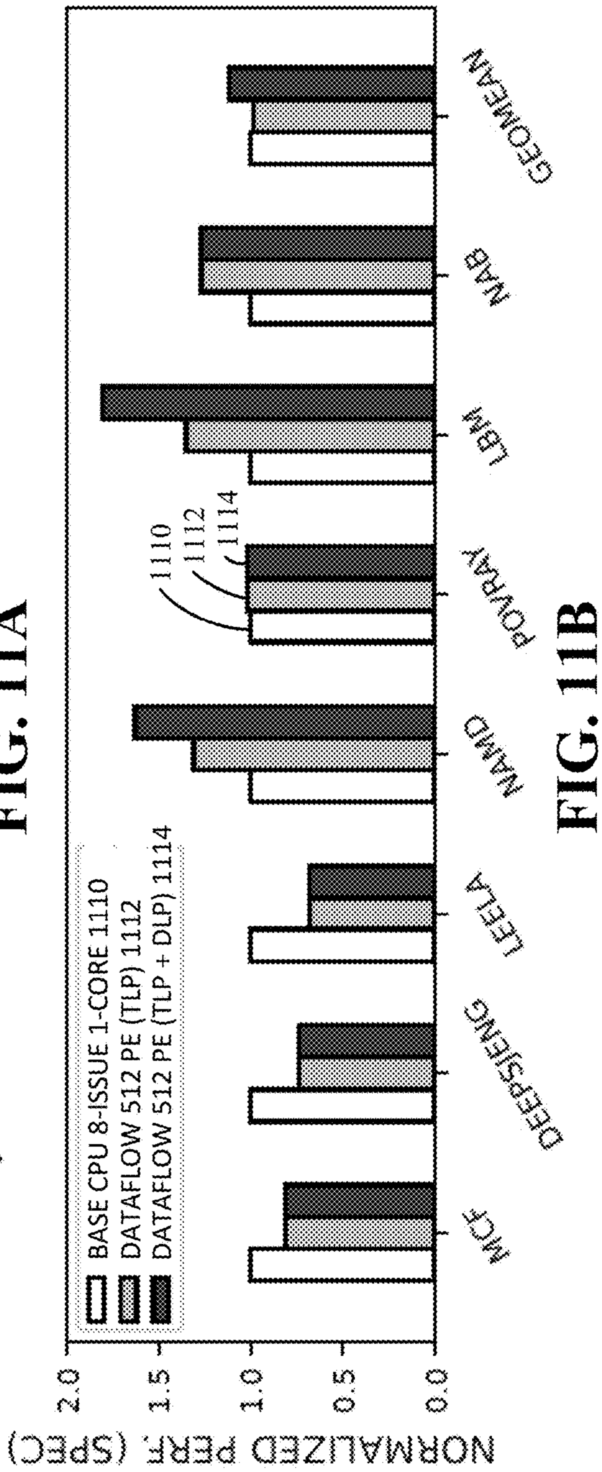
FIG. 11B shows multi-thread performance results of SPEC CPU® 2017 according to some embodiments.

SPEC CPU® Benchmarks. A subset of SPEC CPU® 2017 benchmarks were also evaluated. Identical baseline and the example architecture configurations were used in these tests. Results in FIG. 11A shows that the average single-thread performance for the example architecture is 0.81×, 0.97×, and 0.97× compared to baseline 1102 for configurations with 32 PEs 1104, 256 PEs 1106, and 512 PEs 1108, respectively. For the multithread case in FIG. 11B, the example architecture with 512 PEs 1112 achieves the same average performance relative to baseline 1110 and a speedup of 1.15× with pipelining enabled 1114. Individual results reveal the same trend as *Rodinia* benchmarks where the example architecture excels in the more compute intensive applications and trails behind in memory-bound or control dependent applications.

Figure 12:
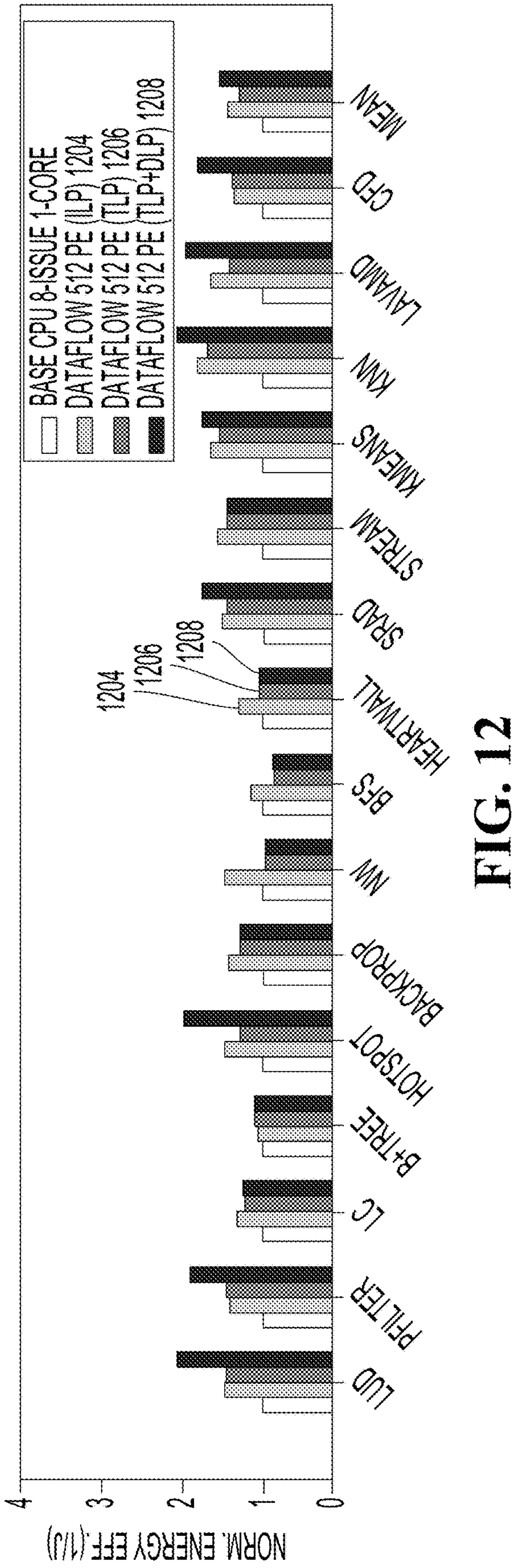
FIG. 12 shows energy efficiency results on the *Rodinia* benchmark suite according to some embodiments.

Energy Efficiency. Dynamic power consumption was measured based on the utilization of PEs and floating-point units. Static power is determined from synthesis and assumed to be constant. FIG. 12 shows energy efficiency improvements in the *Rodinia* benchmarks measured as the inverse of total energy spent during execution. Despite, losing performance on some of the benchmarks evaluated, energy efficiency is improved across most benchmarks in both single 1204 and multi-threaded cases 1206, with an average of 1.51× and 1.35× respectively, and 1.63× with SIMT pipelining 1208 enabled. Energy efficiency is improved largely due to eliminated control overheads as memory and computation structures account for nearly all of the example architecture's power budget. This improvement is most apparent in programs with significant instruction reuse, where already-constructed datapaths can consume only dynamic power for functional units and register lanes.

Figure 13:
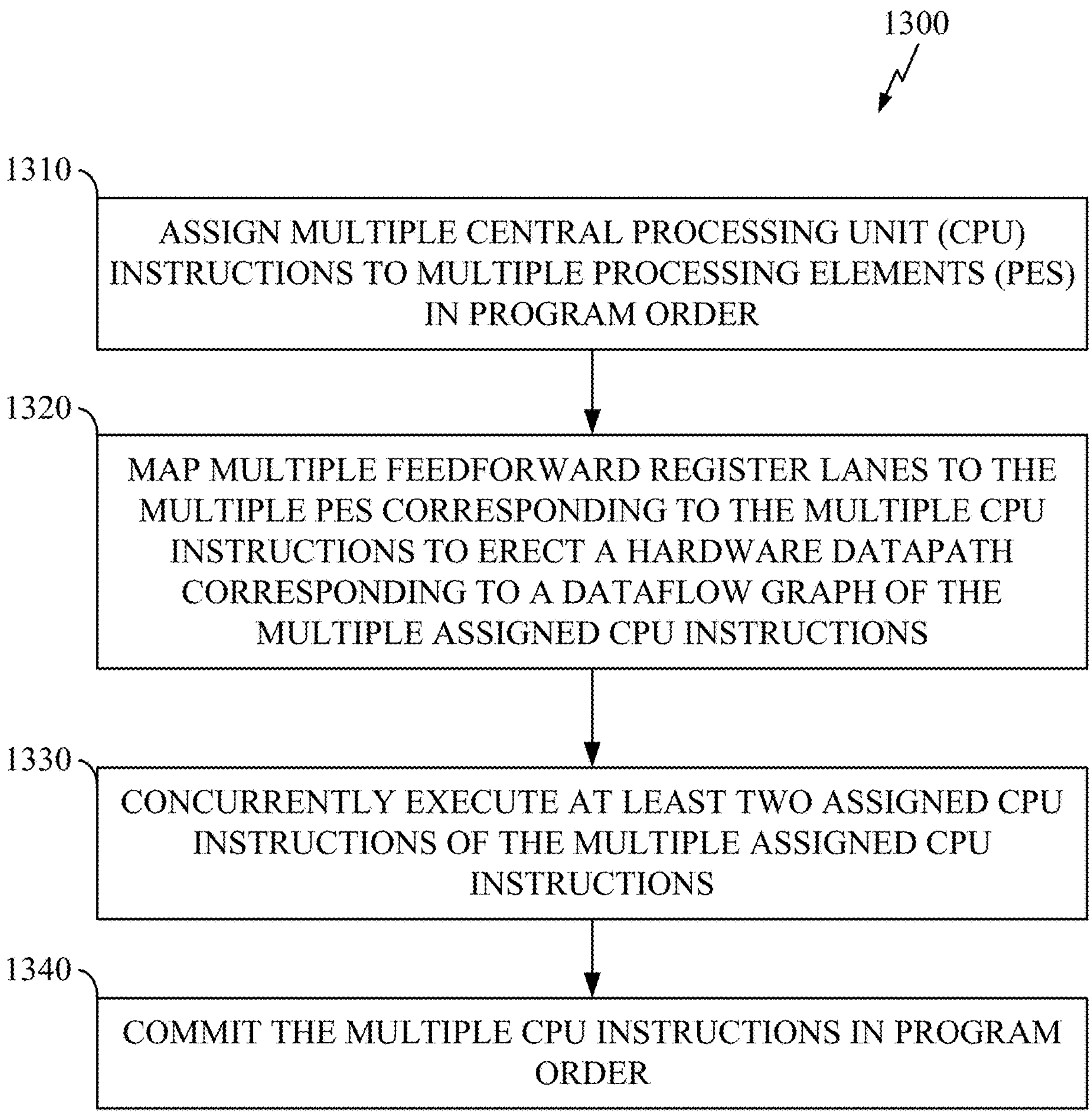
FIG. 13 is a flow chart illustrating an exemplary process for a dataflow-based general-purpose processor architecture according to some aspects of the disclosure.

FIG. 13 is a flow chart illustrating an exemplary process for a dataflow-based general-purpose processor architecture in accordance with some aspects of the present disclosure. In some aspects of this disclosure, the example process in FIG. 13 may be implemented by or with the architecture (e.g., instruction control circuit 610, multiplexers, PEs 102, cluster control circuit 608, or any other suitable circuit) illustrated in and described with respect to FIGS. 1-3A and 4A-9. The architecture can be one or more circuits (e.g., instruction control circuit 610, multiplexers, PEs 102, cluster control circuit 608, and/or any other suitable circuit) or an integrated circuit (e.g., including instruction control circuit 610, multiplexers, PEs 102, cluster control circuit 608, and/or any other suitable circuit). As described below, a particular implementation of the dataflow-based general-purpose processor architecture may omit some or all illustrated features, and may not require some illustrated features to implement all embodiments.

In block 1310, the architecture (e.g., instruction control circuit 610) assigns multiple central processing unit (CPU) instructions (e.g., from the instruction cache 616) to multiple processing elements (PEs) in program order. In some examples, the multiple PEs are physically arranged in a line on a circuit (e.g., a dataflow-based general-purpose processor). See, for example, the PEs (e.g., PEs 102, 408, 410, 604) described throughout and the assignment of CPU instructions (e.g., instructions 112, 302, 406) shown and described with respect to FIGS. 1, 2, 3A, 4C, and 6.

In block 1320, the architecture (e.g., PEs 102 via multiplexers or switches 208) maps (e.g., multiplexes) multiple feedforward register lanes to the multiple PEs corresponding to the plurality of CPU instructions to erect a hardware datapath corresponding to a dataflow graph of the plurality of assigned CPU instructions. For example, the multiple feedforward register lanes are multiplexed at the multiple PEs corresponding to the plurality of CPU instructions based on the PE's assigned instructions' source and destination register addresses to erect a hardware datapath corresponding to a dataflow graph of the plurality of assigned CPU instructions. In some examples, a first feedforward register lane of the multiple feedforward register lanes forms an interconnect between a first PE and a second PE of the multiple PEs to form the dataflow graph.

In some examples, the mapping of the multiple feedforward register lanes to multiple PEs includes selecting, via a switch (e.g., a two-input multiplexer), the register lane's current propagating value or PE's output value on the corresponding destination lane. In some examples, the mapping of the multiple feedforward register lanes to multiple PEs additionally includes selecting, via a switch, whether to direct a register lane's current propagating value as source operand (e.g., RS1 or RS2) to the PE. Each PE controls its own multiplexers 208 and/or switches 207-1, 207-2. That is, with reference to FIGS. 1-2, for example, each PE 102 controls the switches 207-1, 207-2 and/or multiplexers 208 coupled to source registers 106 and destination registers 108, respectively, of that PE 102. Accordingly, the PE 102 can control which register lane is coupled to each source register 106 and to which register lane the destination register 108 is coupled. In some examples, each PE 102 includes an instruction register 112 which stores the instruction, which is assigned to the respective PE. A CPU instruction has up to two source register addresses (for RS1, RS2), and a destination register address (for RD). In some examples, which multiplexer selects the output from the PE (rather than propagating the prior lane) is determined by the destination register address of the instruction assigned to the PE. In some examples, this mapping or selecting process dynamically occurs when the instructions are executed. When a PE writes to a destination register lane and the corresponding feedforward register lane, the PE only changes the feedforward register lane's value for subsequent PEs, not previous PEs.

In some examples, the output of a PE 102 is configured to further carry a valid indication (e.g., a valid bit), which is set to high when a PE 102 writes its output. The valid bit allows subsequent PEs to be aware that the register lane's value is ready and correct. In some examples, a first PE and a second PE of the multiple PEs corresponds to a parent node and a child node in the dataflow graph, respectively. In such examples, an output of the first PE can correspond to a first feedforward register lane of the multiple feedforward register lanes for a source operand of the second PE. In further examples, to map the multiple assigned CPU instructions to the multiple feedforward register lanes, the circuit maps an input of the second PE for the source operand to a destination register lane of the first PE corresponding to the first feedforward register lane. See, for example, the mapping of feedforward register lanes (e.g., lanes 104, 204, 304, 412, 414, 602, and unlabeled lanes) to PEs (e.g., PEs 102, 408, 410) as shown and described above with respect to FIGS. 1, 2, 3A, 4C, 5, 6 and 8A).

In block 1330, the architecture (e.g., PEs 102) concurrently executes at least two assigned CPU instructions of the multiple assigned CPU instructions. In some examples, to concurrently execute the at least two assigned CPU instructions, the circuit identifies one or more first available source operands for a first PE of the multiple PEs and one or more second available source operands for a second PE of the multiple PEs. In further examples, in response to the identifying of the one or more first available source operands and the one or more second available source operands, the circuit concurrently executes a first assigned CPU instruction of the multiple CPU instructions corresponding to the first PE and a second assigned CPU instruction of the multiple CPU instructions corresponding to the second PE. Thus, the circuit can assign the multiple CPU instructions in program order but execute out-of-order. In further examples, the circuit can reuse at least a part of the hardware datapath corresponding to the dataflow graph for a loop iteration. See, for example, the executing of assigned CPU instructions (e.g., instructions 112, 302, 406)) as shown and described above with respect to FIGS. 1, 3A, and 4C).

In block 1340, the architecture (e.g., cluster control circuit 608) commits the multiple CPU instructions in program order. In some examples, the committing of a CPU instruction in program order can include updating the result of the instruction in the register file and/or a cache and freeing any allocated resources for the CPU instruction. In some examples, the cluster control circuit 608 can control the commit of the multiple instructions in a single cluster or multiple clusters. See, for example, the committing of assigned CPU instructions (e.g., instructions 112, 302, 406)) as shown and described above with respect to FIGS. 1, 3A, and 4C).

Accordingly, the dataflow-based general-purpose processor architecture implementing process 1300 provides that CPU instructions are assigned to PEs in program order, are executed out-of-order, and eventually commit in program order.

Embodiments of the present disclosure include a dataflow-based architecture for general-purpose microprocessors that can dynamically construct a reusable execution datapath. In certain embodiments, the example architecture exploits instruction-level parallelism and data-level parallelism while eliminating most of the control overhead of traditional out-of-order processors. In certain embodiments, this is done by replicating a dataflow graph of the program in hardware, which naturally reveals and resolves instruction dependencies. The example architecture can process instructions with reduced power consumption and without sacrificing processing speed or performance. For example, based on experimentation, the example architecture achieves superior energy efficiency, with similar performance under the same frequency, relative to an aggressive out-of-order processor. Under the dark silicon regime, the example architecture is an example of 'spending' area to 'buy' energy efficiency without sacrificing generality.

The present disclosure uses the term "aspects" does not require that all aspects of the disclosure include the discussed feature, advantage or mode of operation. The present disclosure uses the term "coupled" to refer to a direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The present disclosure uses the terms "circuit" and "circuitry" broadly, to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-13 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-13 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

Applicant provides this description to enable any person skilled in the art to practice the various aspects described herein. Those skilled in the art will readily recognize various modifications to these aspects, and may apply the generic principles defined herein to other aspects. Applicant does not intend the claims to be limited to the aspects shown herein, but to be accorded the full scope consistent with the language of the claims, wherein reference to an element in the singular is not intended to mean "one and only one" unless specifically so stated, but rather "one or more." Unless specifically stated otherwise, the present disclosure uses the term "some" to refer to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A circuit for a dataflow-based general-purpose processor architecture comprising:

a plurality of processing elements (PEs), each PE in the plurality of PEs comprising a source register and a destination register;

a plurality of assigned central processing unit (CPU) instructions comprising a first instruction assigned to a first PE of the plurality of PEs;

a register file separate from the PEs and comprising an array of a plurality of processor registers; and a plurality of feedforward register lanes that interconnect the PEs and the register file, and that are configured to map each of the plurality of assigned CPU instructions on the plurality of PEs to the register file or another PE of the plurality of PEs to construct a hardware datapath corresponding to a dataflow graph of the plurality of assigned CPU instructions, wherein the first instruction specifies a first register lane of the plurality of feedforward register lanes as a first source lane, a second register lane of the plurality of feedforward register lanes as a second source lane, and a third register lane of the plurality of feedforward register lanes as a destination lane, and wherein the first PE is configured to:

read a first operand from the first register lane when a first valid bit corresponding to the first register lane indicates the first operand is valid;

read a second operand from the second register lane when a second valid bit corresponding to the second register lane indicates the second operand is valid;

execute the first instruction using the first and second operands; and output a result of the first instruction on the third register lane and set a third valid bit corresponding to the third register lane to indicate the result is valid.

2. The circuit of claim 1, wherein each processor register of the array of the plurality of processor registers corresponds to a register lane of the plurality of feedforward register lanes.

3. The circuit of claim 1, wherein the plurality of PEs comprises a second PE corresponding to a second instruction of the plurality of assigned CPU instructions, the first instruction preceding the second instruction in program order, and wherein in response to the first and second operands being available from the register file for the first PE and one or more second source operands being available from the register file for the second PE, the first PE and the second PE concurrently execute the first instruction and the second instruction.

4. The circuit of claim 1, wherein the plurality of PEs is physically arranged in a line on the circuit.

5. The circuit of claim 4, wherein the dataflow graph comprises a plurality of nodes corresponding to the plurality of assigned CPU instructions and a plurality of edges corresponding to the plurality of feedforward register lanes.

6. The circuit of claim 5, wherein the first PE of the plurality of PEs corresponds to a parent node of the plurality of nodes in the dataflow graph, wherein a second PE of the plurality of PEs corresponds to a child node of the plurality of nodes in the dataflow graph, and wherein the result output by the first PE corresponds to a source operand of the second PE.

7. The circuit of claim 6, further comprising:

a switch configured to select, in response to control by the first PE, a propagating value on the third register lane or the result output of the first PE, wherein in response to the switch selecting the result output of the first PE for the third register lane, a destination register lane of the first PE corresponding to the third register lane carries the result output of the first PE for the source operand of the second PE.

8. The circuit of claim 1, wherein the first register lane of the plurality of feedforward register lanes forms an interconnect between the first PE and a second PE of the plurality of PEs to form the dataflow graph.

9. The circuit of claim 1, wherein the plurality of assigned CPU instructions being assigned to the plurality of PEs commits in program order.

10. The circuit of claim 1, further comprising:

a program counter lane crossing the plurality of PEs for committing the plurality of assigned CPU instructions in program order.

11. The circuit of claim 1, wherein the plurality of PEs reuses at least a part of the hardware datapath corresponding to the dataflow graph for a loop iteration.

12. The circuit of claim 1, wherein the plurality of PEs is grouped into a first processing cluster corresponding to a first subset of the plurality of assigned CPU instructions and a second processing cluster corresponding to a second subset of the plurality of assigned CPU instructions, and wherein in response to executing the first subset of the plurality of assigned CPU instructions, the second processing cluster loads the second subset of the plurality of assigned CPU instructions.

13. The circuit of claim 12, further comprising:

a pipeline register file between the first processing cluster and the second processing cluster.

14. The circuit of claim 1, further comprising:

an instruction controller circuit configured to assign the CPU instructions to the plurality of PEs, wherein each of the plurality of PEs further comprises an instruction register, wherein a first instruction register of the first PE of the plurality of PEs is configured to receive the first instruction of the plurality of CPU instructions or a first CPU instruction address for the first instruction from the instruction controller circuit.

15. A method for a dataflow-based general-purpose processor architecture, comprising:

assigning a plurality of central processing unit (CPU) instructions to a plurality of processing elements (PEs) in program order, each of the plurality of PEs comprising a source register and a destination register;

mapping a plurality of feedforward register lanes to the plurality of PEs corresponding to the plurality of CPU instructions to erect a hardware datapath corresponding to a dataflow graph of the plurality of assigned CPU instructions, wherein the plurality of feedforward register lanes interconnect the PEs and a register file that is separate from the PEs and comprises an array of a plurality of processor registers;

concurrently executing at least two assigned CPU instructions of the plurality of assigned CPU instructions, wherein a first instruction of the at least two assigned CPU instructions is assigned to a first PE of the plurality of PEs and specifies a first register lane of the plurality of feedforward register lanes as a first source lane, a second register lane of the plurality of feedforward register lanes as a second source lane, and a third register lane of the plurality of feedforward register lanes as a destination lane;

reading a first operand from the first register lane when a first valid bit corresponding to the first register lane indicates the first operand is valid;

reading a second operand from the second register lane when a second valid bit corresponding to the second register lane indicates the second operand is valid;

executing, by the first PE, the first instruction using the first and second operands;

outputting, by the first PE, a result of the first instruction on the third register lane and setting a third valid bit corresponding to the third register lane to indicate the result is valid; and committing the plurality of CPU instructions in program order.

16. The method of claim 15, wherein the plurality of PEs is physically arranged in a line on a circuit.

17. The method of claim 15, wherein the first register lane of the plurality of feedforward register lanes forms an interconnect between the first PE and a second PE of the plurality of PEs to form the dataflow graph.

18. The method of claim 15, wherein the first PE of the plurality of PEs corresponds to a parent node in the dataflow graph, wherein a second PE of the plurality of PEs corresponds to a child node in the dataflow graph, wherein the result output by the first PE corresponds to a source operand of the second PE, and wherein the mapping of the plurality of feedforward register lanes to the plurality of PEs corresponding to the plurality of CPU instructions comprises: mapping an input of the second PE for the source operand to the destination lane of the first PE corresponding to the third register lane.

19. The method of claim 15, further comprising:

concurrently executing at least two further assigned CPU instructions, wherein the concurrently executing of the at least two further assigned CPU instructions comprises:

identifying one or more first available source operands for the first PE of the plurality of PEs and one or more second available source operands for a second PE of the plurality of PEs; and in response to the identifying of the one or more first available source operands and the one or more second available source operands, concurrently executing a first assigned CPU instruction of the two further assigned CPU instructions corresponding to the first PE and a second assigned CPU instruction of the two further assigned CPU instructions corresponding to the second PE.

20. The method of claim 15, further comprising:

reusing at least a part of the hardware datapath corresponding to the dataflow graph for a loop iteration.

21. The method of claim 15, wherein the first register lane and the third register lane are a same register lane that both correspond to a first processor register of the array of the plurality of processor registers of the register file.

* * * * *